US006702718B2

(12) United States Patent
Tani et al.

(10) Patent No.: US 6,702,718 B2
(45) Date of Patent: Mar. 9, 2004

(54) ENGINE CONTROL APPARATUS

(75) Inventors: Keisuke Tani, Kariya (JP); Akira Kato, Anjo (JP); Masaru Kamiya, Toyoake (JP); Takahiro Souki, Handa (JP)

(73) Assignee: Denso Corporation, Aichi-Pref (JP)

( * ) Notice: Subject to any disclaimer, the term of this patent is extended or adjusted under 35 U.S.C. 154(b) by 0 days.

(21) Appl. No.: 10/055,035

(22) Filed: Jan. 25, 2002

(65) Prior Publication Data

US 2002/0103055 A1 Aug. 1, 2002

(30) Foreign Application Priority Data

Jan. 26, 2001 (JP) ...................................... 2001-018945
Jan. 26, 2001 (JP) ...................................... 2001-018954
Mar. 19, 2001 (JP) ...................................... 2001-078560

(51) Int. Cl.[7] .......................... B60K 41/20; B60K 41/02
(52) U.S. Cl. .......................................... 477/203; 477/4
(58) Field of Search ................................ 477/183, 187, 477/203, 3, 4; 701/112, 113, 102, 110

(56) References Cited

U.S. PATENT DOCUMENTS

| 5,497,741 | A | | 3/1996 | Tashiro et al. | |
| 6,135,920 | A | | 10/2000 | Kamiya et al. | |
| 6,190,284 | B1 | * | 2/2001 | Kuroda et al. | ............ 477/112 X |
| 6,308,129 | B1 | * | 10/2001 | Uchida | .................... 477/203 X |
| 6,330,873 | B1 | * | 12/2001 | Letang et al. | ................ 123/322 |

FOREIGN PATENT DOCUMENTS

| JP | 57-193035 | 5/1981 |
| JP | 58-30433 | 2/1983 |
| JP | 58-30434 | 2/1983 |
| JP | 2-200538 | 8/1990 |
| JP | 2-256843 | 10/1990 |
| JP | 58-166165 | 10/1993 |
| JP | 6-341522 | 12/1994 |
| JP | 7-34950 | 2/1995 |
| JP | 408061110 | * 3/1996 |
| JP | 8-189395 | 7/1996 |
| JP | 9-32601 | 2/1997 |
| JP | 10-122008 | 5/1998 |
| JP | 11-257115 | 9/1999 |
| JP | 11-270378 | 10/1999 |
| JP | 2000-8905 | 1/2000 |

OTHER PUBLICATIONS

Tamal et al, SAE International Article, The Engineering Society for Advancing Mobility in Land Sea Air and Space, Mar. 5, 2001, pp. 1–11, 2001–01–0326, "The Saturn Engine Stop–Start System with an Automatic Transmission".

* cited by examiner

Primary Examiner—Roger Pang
(74) Attorney, Agent, or Firm—Nixon & Vanderhye PC

(57) ABSTRACT

An engine control apparatus includes a brake depression degree detecting device for detecting a degree of depression of a brake pedal in a vehicle. A brake depression degree judging device operates for judging whether or not the detected degree of depression of the brake pedal is smaller than a prescribed value. A deceleration detecting device operates for detecting a deceleration of the vehicle. An automatic engine stop and restart controlling device operates for automatically stopping an engine powering the vehicle when the deceleration detecting device detects a deceleration of the vehicle and the brake depression degree judging device judges that the detected degree of depression of the brake pedal is not smaller than the prescribed value.

8 Claims, 24 Drawing Sheets

FIG. 17

| RANGE | ENGAGED GEAR | CLUTCH | | | BRAKE | | | ONE-WAY CLUTCH | |
|---|---|---|---|---|---|---|---|---|---|
| | | C1 | C2 | C3 | B1 | B2 | B3 | F1 | F2 |
| P | PARKING | | | | | | ○ | | |
| R | REVERSE | | ○ | | | ○ | ○ | | |
| N | NEUTRAL | | | | | | ○ | | |
| D | FIRST | ○ | | | | | ○ | ○ | ○ |
| | SECOND | ○ | | | ○ | | ○ | | ○ |
| | THIRD | ○ | ○ | | | | ○ | | ○ |
| | FOURTH | ○ | ○ | ○ | | | | | |
| 2 | FIRST | ○ | | | | | ○ | ○ | ○ |
| | SECOND | ○ | | | ○ | | ○ | | ○ |
| L | FIRST | ○ | | | | ○ | ○ | ○ | ○ |

○ DENOTES ENGAGEMENT

FIG. 23
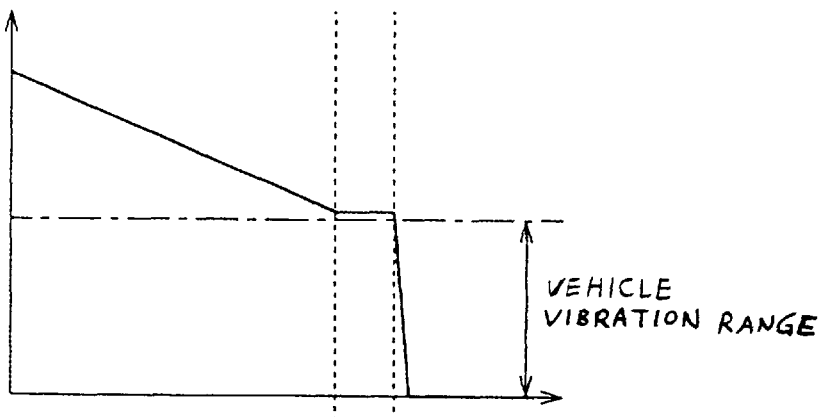
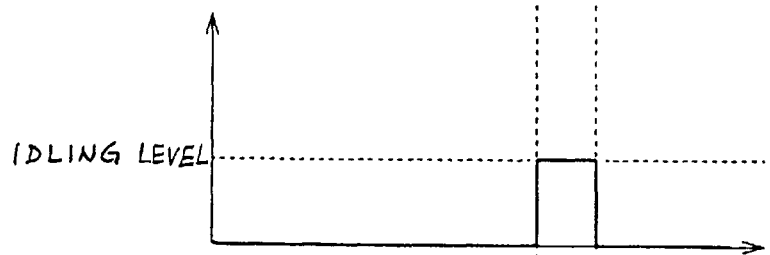
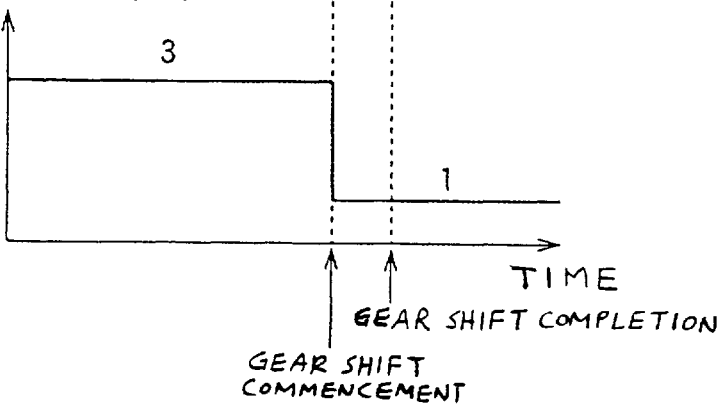

ENGINE CONTROL APPARATUS

BACKGROUND OF THE INVENTION

1. Field of the Invention

This invention generally relates to an apparatus for controlling an engine such as an automotive engine. This invention particularly relates to an apparatus for automatically stopping and restarting an automotive engine.

2. Description of the Related Art

Japanese patent application publication number 58-166165 discloses a vehicle powered by an internal combustion engine and having an automatic transmission. The automatic transmission is provided with a torque converter and a lock-up clutch. The lock-up clutch selectively couples and uncouples the input shaft and the output shaft of the torque converter to and from each other. In Japanese application 58-166165, when an engine throttle valve is fully closed and the vehicle speed and the engine speed are higher than prescribed speeds, the supply of fuel to the engine is cut off. During the execution of the fuel cut-off, a decision is made as to whether or not the rate of the drop in the vehicle speed is higher than a prescribed value. When the vehicle-speed drop rate is higher than the prescribed value, the lock-up clutch is set in a disengaged position at which the input shaft and the output shaft of the torque converter are uncoupled from each other. On the other hand, when the vehicle-speed drop rate is lower than the prescribed value, the lock-up clutch is set in an engaged position at which the input shaft and the output shaft of the torque converter are coupled to each other.

Japanese patent application publication number 11-257115 discloses an engine stop control apparatus for a vehicle equipped with an automatic transmission. In the apparatus of Japanese application 11-257115, the supply of fuel to an engine is cut off and then the fuel supply is resumed under prescribed vehicle operating conditions. During deceleration of the vehicle, resumption of the fuel supply is inhibited when the automatic-transmission shift position is an N position or a P position, or when a brake pedal is depressed although the shift position is a D position or an R position. The inhibition of resumption of the fuel supply prevents the engine from unnecessarily idling. In the apparatus of Japanese application 11-257115, even when the brake pedal is lightly depressed and then an accelerator pedal is depressed, the engine is stopped and subsequently restarted. The engine stop and subsequent engine restart cause a rough ride in the vehicle.

Japanese patent application publication number 8-189395 discloses an apparatus for automatically starting and stopping an automotive engine. The features of the apparatus of Japanese application 8-189395 are as follows. Even in conditions for the cutoff of fuel supply to the engine are not satisfied, the fuel cut-off is executed provided that conditions for automatic engine stop are satisfied. During the satisfaction of the conditions for automatic engine stop, when clutch releasing conditions are satisfied, a clutch is controlled in its release state and the engine is automatically stopped. When conditions for automatic engine start are satisfied, the engine is controlled to automatically start. When conditions for normal clutch control are satisfied, the clutch is controlled in its normal state.

Japanese patent application publication number 2-200538 discloses an apparatus for controlling a vehicle powered by an engine and including an automatic transmission and a motor/generator. The automatic transmission has a torque converter provided with a lock-up clutch. Operation of the motor/generator can be changed between a motor mode and a generator mode. During the motor mode of operation, the motor/generator operates as a motor for driving the engine. During the generator mode of operation, the motor/generator operates as a generator driven by the engine. The supply of fuel to the engine can be selectively cut off and resumed. During a fuel supply resuming procedure, the lock-up clutch is set in a disengaged state, and then the engine is driven by the motor/generator. Thus, the setting of the lock-up clutch in its disengaged state is always followed by the drive of the engine by the motor/generator. Since the drive of the engine by the motor/generator consumes power, the setting of the lock-up clutch in its disengaged state is always followed by a power consumption stage.

SUMMARY OF THE INVENTION

It is an object of this invention to provide an engine control apparatus which gives a better ride in a vehicle.

A first aspect of this invention provides an engine control apparatus comprising brake depression degree detecting means for detecting a degree of depression of a brake pedal in a vehicle; brake depression degree judging means for judging whether or not the detected degree of depression of the brake pedal is smaller than a first prescribed value; deceleration detecting means for detecting a deceleration of the vehicle; and automatic engine stop and restart controlling means for automatically stopping an engine powering the vehicle when the deceleration detecting means detects a deceleration of the vehicle and the brake depression degree judging means judges that the detected degree of depression of the brake pedal is not smaller than the first prescribed value.

A second aspect of this invention is based on the first aspect thereof, and provides an engine control apparatus further comprising fuel supply controlling means for cutting off a supply of fuel to the engine when the deceleration detecting means detects a deceleration of the vehicle, and for resuming the supply of fuel to the engine when the brake depression degree judging means judges that the detected degree of depression of the brake pedal is smaller than the first prescribed value.

A third aspect of this invention is based on the first aspect thereof, and provides an engine control apparatus further comprising engine speed detecting means for detecting a rotational speed of the engine, and wherein the brake depression degree judging means executes judging whether or not the detected degree of depression of the brake pedal is smaller than the first prescribed value when the rotational engine speed detected by the engine speed detecting means drops to a reference value set on the basis of a maximum speed in a range of resonance between the engine and a body of the vehicle.

A fourth aspect of this invention is based on the first aspect thereof, and provides an engine control apparatus wherein the automatic engine stop and restart controlling means comprises means for temporarily increasing a load caused by an accessory in the vehicle when automatically stopping the engine.

A fifth aspect of this invention is based on the first aspect thereof, and provides an engine control apparatus wherein the brake depression degree judging means operates for judging whether or not the detected degree of depression of the brake pedal is greater than a second prescribed value smaller than the first prescribed value, and the automatic engine stop and restart controlling means operates for restarting the engine when the brake depression degree judges that the detected degree of depression of the brake pedal is not greater than the second prescribed value.

A sixth aspect of this invention is based on the first aspect thereof, and provides an engine control apparatus further comprising brake depression speed detecting means for detecting a speed of depression of a brake pedal in the vehicle, and wherein the automatic engine stop and restart controlling means inhibits automatic stop of the engine when the speed detected by the brake depression speed detecting means is higher than a predetermined speed.

A seventh aspect of this invention is based on the first aspect thereof, and provides an engine control apparatus further comprising relative speed detecting means for detecting a relative speed between the vehicle and a preceding vehicle, and wherein the automatic engine stop and restart controlling means inhibits automatic stop of the engine when the relative speed detected by the relative speed detecting means is higher than a predetermined speed.

An eighth aspect of this invention is based on the first aspect thereof, and provides an engine control apparatus further comprising steering angle detecting means for detecting a steering angle of a steering wheel in the vehicle, and wherein the automatic engine stop and restart controlling means inhibits automatic stop of the engine when the steering angle detecting means detects a steering angle greater than a predetermined value.

A ninth aspect of this invention is based on the first aspect thereof, and provides an engine control apparatus further comprising road surface slope angle detecting means for detecting a slope angle of a road surface which the vehicle is on, and wherein the automatic engine stop and restart controlling means inhibits automatic stop of the engine when the slope angle detected by the road surface slope angle is greater than a predetermined value.

A tenth aspect of this invention provides an engine control apparatus comprising engine speed detecting means for detecting a rotational speed of an engine; torque imparting means for imparting a torque to the engine; fuel injecting means for injecting fuel into the engine; means for activating the torque imparting means to impart a torque to the engine and activating the fuel injecting means to inject fuel into the engine to restart the engine when the rotational speed detected by the engine speed detecting means is lower than a reference speed; and means for activating the fuel injecting means to inject fuel into the engine to restart the engine without activating the torque imparting means when the rotational speed detected by the engine speed detecting means is equal to or higher than the reference speed.

An eleventh aspect of this invention is based on the tenth aspect thereof, and provides an engine control apparatus further comprising means for continuously activating the torque imparting means to continuously impart a torque to the engine until the rotational speed detected by the engine speed detecting means rises to the reference speed.

A twelfth aspect of this invention is based on the tenth aspect thereof, and provides an engine control apparatus further comprising a one-way clutch provided between the torque imparting means and a crankshaft of the engine.

A thirteenth aspect of this invention is based on the tenth aspect thereof, and provides an engine control apparatus further comprising means for detecting a warm-up condition of the engine, and means for changing the reference speed in response to the detected warm-up condition.

A fourteenth aspect of this invention provides an engine control apparatus comprising an automatic transmission changeable to a specified state in which a transmission of motive power from an engine toward axles is permitted while a transmission of motive power from the axles toward the engine is cut off; automatic engine stopping and starting means for automatically stopping the engine when prescribed engine stop conditions are satisfied, and for automatically starting the engine when prescribed engine restart conditions are satisfied; and means for changing the automatic transmission to the specified state when the automatic engine stopping and starting means automatically stops the engine.

A fifteenth aspect of this invention is based on the fourteenth aspect thereof, and provides an engine control apparatus wherein the automatic transmission is changeable to a plurality of given states in which a transmission of motive power from the engine toward the axles is permitted while a transmission of motive power from the axles toward the engine is cut off, the engine brake is expected to be effected for first ones of the given states, the engine brake is not expected to be effected for second one of the given states, and the second one of the given states is used as the specified state.

A sixteenth aspect of this invention is based on the fourteenth aspect thereof, and provides an engine control apparatus wherein the prescribed engine stop conditions are determined by vehicle deceleration and a gear position of the automatic transmission that prevents engine speed from dropping to a vehicle vibration range.

A seventeenth aspect of this invention is based on the fourteenth aspect thereof, and provides an engine control apparatus further comprising means for generating a hydraulic pressure to operate the automatic transmission during a stop of the engine.

An eighteenth aspect of this invention is based on the fourteenth aspect thereof, and provides an engine control apparatus further comprising engine speed maintaining means for maintaining a rotational speed of the engine above a predetermined speed to avoid vehicle vibration during a transitional period between commencement of the change of the automatic transmission to the specified state and completion thereof.

A nineteenth aspect of this invention is based on the eighteenth aspect of this invention, and provides an engine control apparatus wherein the engine speed maintaining means comprises means for supplying fuel to the engine.

A twentieth aspect of this invention is based on the eighteenth aspect thereof, and provides an engine control apparatus wherein the engine speed maintaining means comprises an electric motor mechanically connected with a crankshaft of the engine, and means for activating the electric motor.

BRIEF DESCRIPTION OF THE DRAWINGS

FIG. 17 is a diagram of a relation among a shift range, an engaged gear, the states of clutches C1, C2, C3, F1, and F2, and the states of brakes B1, B2, and B3 in the transmission of FIG. 16.

FIG. 23 is a time-domain diagram of an example of conditions of engine speed, fuel supply, and gear shift command during the execution of an engine stop procedure in the fifth embodiment of this invention.

DETAILED DESCRIPTION OF THE INVENTION

First Embodiment

Figure 1:
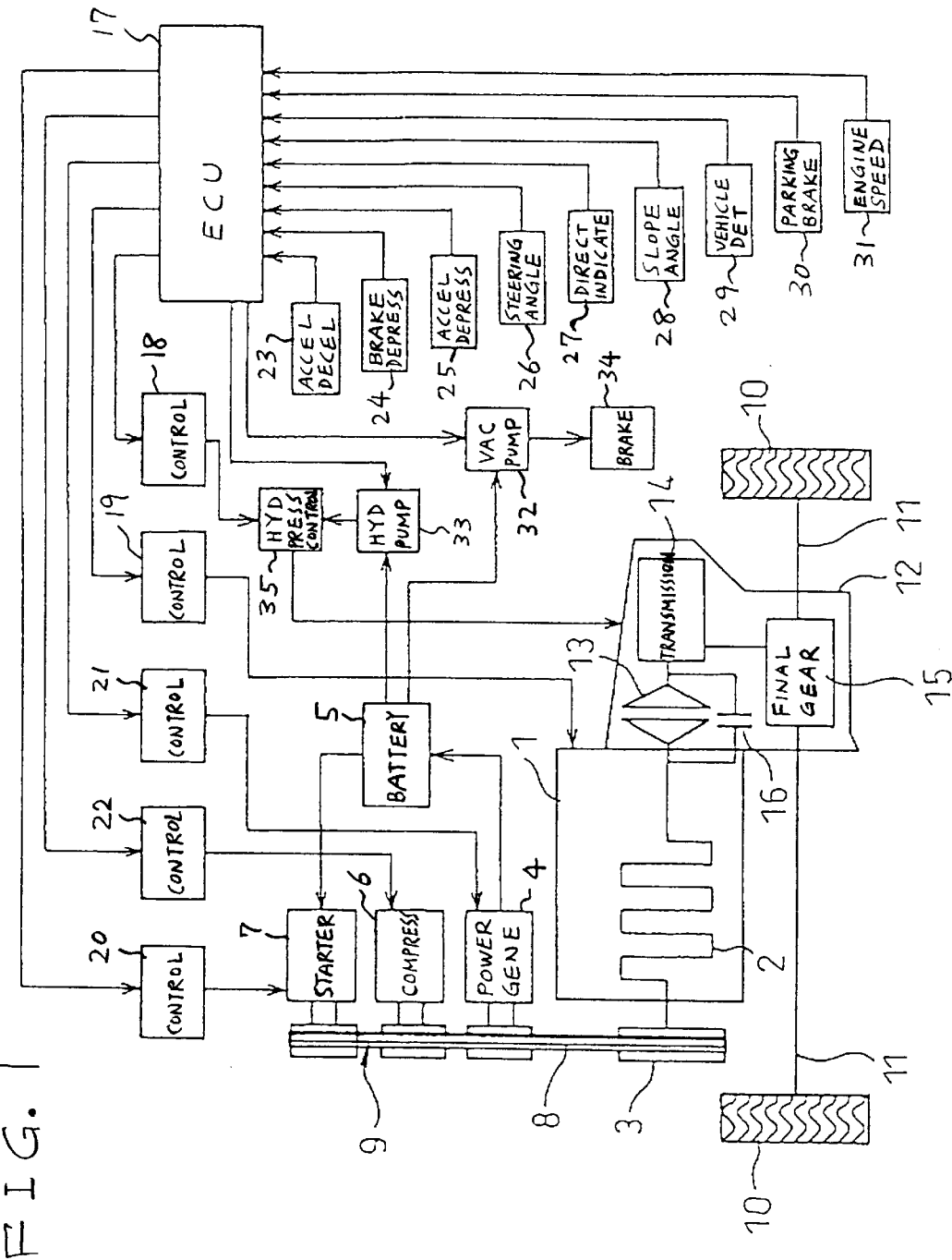
FIG. 1 is a diagram of a system including an engine control apparatus according to a first embodiment of this invention.

FIG. 1 shows a system composed of a drive apparatus for a vehicle and a control apparatus for the vehicle. The system includes an engine control apparatus according to a first embodiment of this invention.

With reference to FIG. 1, an engine 1 for powering the vehicle has a body and a crankshaft 2 rotatably supported by the body. A crank pulley 3 is mounted on an end of the crankshaft 2. A power generator 4 such as an alternator has a rotatable shaft provided with a pulley. The power generator 4 can be driven as the crankshaft 2 rotates. Thus, the power generator 4 can be driven by the engine 1. A battery 5 can be charged by electric power produced by the power generator 4. A compressor 6 in an air conditioner has a rotatable shaft provided with a pulley. The compressor 6 can be driven as the crankshaft 2 rotates. Thus, the compressor 6 can be driven by the engine 1. A starter motor 7 has a rotatable shaft provided with a pulley. One-way clutch may be provided between the pulley and the shaft of the starter motor 7. The starter motor 7 forms a portion of a device for automatically starting or restarting the engine 1.

The power generator 4 and the air-conditioner compressor 6 are examples of accessories being driven-side devices. The crank pulley 3 on the crankshaft 2 and the pulleys on the shafts of the power generator 4, the air-conditioner compressor 6, and the starter motor 7 are connected by a belt 8. Therefore, the pulleys on the shafts of the power generator 4, the air-conditioner compressor 6, and the starter motor 7 rotate as the crank pulley 3 rotates. The crank pulley 3 on the crankshaft 2, the pulleys on the shafts of the power generator 4, the air-conditioner compressor 6, and the starter motor 7, and the belt 8 compose a power transmission mechanism 9 of a continually engaged type which has a small flexibility. The belt 8 may be replaced by a chain. The starter motor 7 may be usable as a power generator. In this case, the power generator 4 may be omitted, and the starter motor 7 can be used instead thereof.

The vehicle has left-hand and right-hand drive wheels 10 connected to left-hand and right-hand axles 11 respectively. An automatic transmission apparatus 12 is provided in a main power transmission system extending from the crankshaft 2 of the engine 1 to the left-hand and right-hand axles 11. The automatic transmission apparatus 12 has a known structure. The automatic transmission apparatus 12 has an input stage for receiving motive power from the crankshaft 2 of the engine 1. The input stage of the automatic transmission apparatus 12 is provided with a hydraulic torque converter 13 in which a pump and a turbine oppose each other. The automatic transmission apparatus 12 includes a transmission 14 and a final-stage reduction gear device 15. The transmission 14 follows the torque converter 13. The transmission 14 includes a gear train, hydraulic clutches, and hydraulic brakes. The final-stage reduction gear device 15 is connected to the left-hand and right-hand axles 11. The final-stage reduction gear device 15 includes a differential gear train.

The automatic transmission apparatus 12 includes a lock-up clutch 16 provided in parallel with the torque converter 13. The lock-up clutch 16 can be changed between an engaged state and a disengaged state (an ON state and an OFF state). The lock-up clutch 16 couples and uncouples the input side and the output side of the torque converter 13 to and from each other when assuming its engaged state and its disengaged state, respectively. When the lock2 up clutch 16 couples the input side and the output side of the torque converter 13 to each other, the torque converter 13 is disabled and the input side and the output side thereof rotate together. In this case, the crankshaft 2 of the engine 1 is directly connected with the axles 11 of the drive wheels 10. On the other hand, when the lock-up clutch 16 uncouples the input side and the output side of the torque converter 13 from each other, the torque converter 13 is enabled. Thus, the lock-up clutch 16 serves as a controllable direct-connection transmitting means. Here, "direct connection" means a state in which the input side and the output side of the torque converter 13 are coupled to each other. When the input side and the output side of the torque converter 13 are coupled to each other, working fluid in the torque converter 13 is prevented from causing a power loss. In specified vehicle traveling conditions such as high-speed steady vehicle traveling conditions or vehicle decelerating conditions, the lock-up clutch 16 is controlled to couple the input side and the output side of the torque converter 13 to each other. The transmission 14 can be arbitrarily controlled in a neutral state by a transmission controlling means (a transmission controlling device) mentioned later. When the transmission 14 is in its neutral state, the crankshaft 2 of the engine 1 is disconnected from the axles 11 of the drive wheels 10. In this case, the transmission of motive power between the crankshaft 2 and the axles 11 is cut off.

The automatic transmission apparatus 12 may be of another structure designed as follows. The automatic transmission apparatus 12 can be changed between a first state and a second state by an electronic controlling means (an electronic controlling device). The first state corresponds to a directly-connected state. When the automatic transmission apparatus 12 is in its first state (its directly-connected state), the transmission of torque between the crankshaft 2 of the engine 1 and the axles 11 of the drive wheels 10 is permitted. The second state corresponds to a neutral state. When the automatic transmission apparatus 12 is in its second state (its neutral state), at least the transmission of torque from the axles 11 toward the crankshaft 2 is cut off.

The automatic transmission apparatus 12 may be of still another structure dispensing with a torque converter and designed as follows. The automatic transmission apparatus 12 includes a transmission of a continually engaged type, and a control clutch connected in series to the front end or the rear end (the input side or the output side) of the transmission. The control clutch includes, for example, an electromagnetic clutch which can be controlled by an electronic controlling means (an electronic controlling device). The control clutch acts to selectively permit and cut off the transmission of torque between the crankshaft 2 of the engine 1 and the axles 11 of the drive wheels 10.

An electronic control unit (ECU) 17 is designed for automatically stopping and restarting the engine 1. The control unit 17 outputs a command to automatically stop the engine 1 and a command to automatically restart the engine 1. The control unit 17 includes a combination of at least one microprocessor, memories, a clock device, and an input/output port. The memories include a ROM and a RAM. The control unit 17 generates various commands or various control signals (including the engine stopping command and the engine restarting command) by a calculation procedure using output signals from detecting means (detecting devices) and maps provided in the ROM. The detecting means include sensors and switches. The detecting means are provided in portions of the vehicle and the engine 1. The control unit 17 receives the output signals of the detecting means which represent operating conditions of the engine 1 and the vehicle. The control unit 17 produces commands (control signals) as a result of the calculation procedure. The control unit 17 outputs the produced commands toward controlling means (controlling devices) which include drive units of various devices and apparatuses.

The controlling means for driving target devices and apparatuses in response to commands from the control unit 17 include a controlling means (a controlling device) 18 for the automatic transmission apparatus 12. The controlling means 18 outputs commands to a hydraulic pressure control mechanism 35, and thereby controls the automatic transmission apparatus 12. Hydraulic clutches or and other hydraulic devices in the automatic transmission apparatus 12 are operated by the hydraulic pressure control mechanism 35, and hence a gear change in the transmission 14 is performed. The combination of the controlling means 18 and the hydraulic pressure control mechanism 35 changes the transmission 14 to and from its neutral state in response to commands from the control unit 17. Furthermore, the combination of the controlling means 18 and the hydraulic pressure control mechanism 35 changes the lock-up clutch 16 between its engaged state and its disengaged state in response to commands from the control unit 17. The hydraulic pressure control mechanism 35 includes a controlling means (a controlling device) for the direct-connection transmitting means, that is, the lock-up clutch 16. In the case where the series-connected control clutch is used, this control means acts to change the series-connected control clutch between its engaged position and its disengaged position. There is a controlling means (a controlling device) 19 for the engine 1 which is controlled by the control unit 17. The controlling means 19 includes an engine ECU, and drive devices operating in response to commands from the engine ECU. The controlling means 19 contains a fuel-injection controlling means operating for cutting off, permitting (resuming), and controlling the injection of fuel into the engine 1. There is a controlling means (a controlling device) 20 for the starter motor 7 which is controlled by the control unit 17. The controlling means 20 includes, for example, a switch (a starter switch) for selectively permitting and inhibiting the feed of electric power from the battery 5 to the starter motor 7. In the case where electric power is fed from the battery 5 to the starter motor 7 by operation of the controlling means 20, the starter motor 7 drives the crankshaft 2 of the engine 1 to restart the engine 1. The starter controlling means 20 and the starter motor 7 compose an automatic starter apparatus.

A controlling means (a controlling device) 21 acts to control the rate of power generation by the power generator 4. The controlling means 21 is controlled by the control unit 17. When the controlling means 21 increases the rate of power generation by the power generator 4, the power generator 4 operates as a brake with respect to the engine 1. In this case, a braking force is transmitted from the power generator 4 to the crankshaft 2 via the belt 8, and rotation of the crankshaft 2 is suppressed. The air-conditioner compressor 6 can be used as a direct brake with respect to the crankshaft 2. Even in the case where the air conditioner is not required to operate, a controlling means (a controlling device) 22 can activate the compressor 6 and also increase a mechanical load caused by the compressor 6 to raise the rate of motive power consumption by the compressor 6. The controlling means 22 is controlled by the control unit 17. The load on the crankshaft 2 of the engine 1 can be temporarily increased by the control means 21 and 22.

Various detecting means (various detecting devices) generate signals representing operating conditions of the engine 1 and the vehicle, and feed the generated signals to the control unit 17. The signals fed from the detecting means are used by the control unit 17 in executing prescribed control procedures including an engine stop procedure and an engine restart procedure. An acceleration/deceleration detecting means (an acceleration/deceleration detecting device) 23 acts to detect the acceleration and deceleration of the vehicle. The acceleration/deceleration detecting means 23 includes a vehicle speed sensor for detecting the rotational speed of at least one of the left-hand and right-hand axles 11 as an indication of the speed of the vehicle. An output signal from the vehicle speed sensor which represents the speed of the vehicle is fed to the control unit 17. The acceleration/deceleration detecting means 23 includes a portion of the control unit 17 which calculates the acceleration and deceleration of the vehicle by processing the output signal from the vehicle speed sensor.

A brake depression degree detecting means (a brake depression degree detecting device) 24 acts to detect the degree of depression of a brake pedal (not shown) provided in the vehicle and operated by a vehicle driver. The degree of depression of the brake pedal may be the brake stroke, the brake depression angle, or the strength of a force of depressing the brake pedal. The brake depression degree detecting means 24 includes, for example, a potentiometer mechanically connected to a rotary shaft of the brake pedal. An output signal from the brake depression degree detecting means 24 which represents the degree of depression of the brake pedal is fed to the control unit 17. The control unit 17 calculates the speed or rate of depression of the brake pedal by differentiating the output signal of the brake depression degree detecting means 24 with respect to time. A detecting means (a detecting device) 25 acts to detect the degree of depression of an accelerator pedal (not shown) provided in the vehicle and operated by the vehicle driver. The degree of depression of the accelerator pedal may be the accelerator pedal position. An output signal from the detecting means 25 which represents the degree of depression of the accelerator pedal is fed to the control unit 17. The detecting means 25 includes, for example, an accelerator-pedal position sensor. The detecting means 25 may include an accelerator switch operated in accordance with the depression of the accelerator pedal.

A steering angle detecting means (a steering angle detecting device) 26 acts to detect the steering angle of a vehicle steering wheel (not shown) operated by the vehicle driver. An output signal from the steering angle detecting means 26 which represents the steering angle is fed to the control unit 17. Preferably, the steering angle detecting means 26 is designed to generate a specified signal when the steering angle exceeds a prescribed value in the clockwise direction or the counterclockwise direction. The steering angle detecting means 26 includes, for example, switches associated with the steering shaft in the steering column that change to their ON positions when the steering shaft rotates from its neutral position through a prescribed angle or more in the clockwise direction and the counterclockwise direction, respectively. A detecting means (a detecting device) 27 relates to operation of direction indicators. The detecting means 27 includes, for example, a pair of left-hand and right-hand winker switches (left-hand and right-hand blinker switches). When the left-hand winker switch or the right-hand winker switch is changed to its ON position, the detecting means 27 outputs a corresponding signal to the control unit 17.

A road surface slope angle detecting means (a road surface slope detecting device) 28 acts to detect the slope angle of the road surface on which the vehicle is traveling. The road surface slope angle detecting means 28 includes, for example, a pendulum provided at a suitable place in the vehicle, and a switch changing to its ON position when the angle of the pendulum exceeds a prescribed angle. A preceding-vehicle detecting means (a preceding-vehicle detecting device) 29 acts to detect a preceding vehicle with respect to the present vehicle. Here, a preceding vehicle means a vehicle traveling ahead of the present vehicle. Preferably, the preceding-vehicle detecting means 29 is capable of calculating the distance between the present vehicle and the preceding vehicle. Output signals from the preceding-vehicle detecting means 29 which represent the existence of a preceding vehicle and the distance between the preceding vehicle and the present vehicle are fed to the control unit 17. The preceding-vehicle detecting means 29 includes, for example, an automatically-operated distance measurement device mounted on the front of the vehicle. The control unit 17 calculates the relative speed between the preceding vehicle and the present vehicle by processing the signal representing the distance therebetween.

A detecting means (a detecting device) 30 acts to detect operating conditions of a parking brake. An output signal from the detecting means 30 which represents the operating conditions of the parking brake is fed to the control unit 17. The detecting means 30 includes, for example, a switch which changes to its ON position when the parking brake is in its engaged state. A detecting means (a detecting device) 31 acts to detect the rotational speed of the engine 1, that is, the rotational speed of the crankshaft 2. The rotational speed of the crankshaft 2 is also referred to as the engine speed. An output signal from the detecting means 31 which represents the rotational speed of the engine 1 is fed to the control unit 17. In the case where the engine 1 is of a spark ignition type, the detecting means 31 includes a spark-related device generating a signal reflecting pulses of a spark signal. In this case, the control unit 17 calculates the rotational speed of the engine 1 by referring to an output signal from the spark-related device and counting pulses of the spark signal for every unit time.

An electrically-driven vacuum pump 32 communicates with a vehicle brake system 34. The vacuum pump 32 is driven by the battery 5 under the control by the control unit 17 to generate a vacuum for operating the brake system 34 during stop or suspension of the engine 1. An electrically-driven hydraulic pump 33 communicates with the hydraulic pressure control mechanism 35. The hydraulic pump 33 is driven by the battery 5 under the control by the control unit 17 to generate a hydraulic working pressure for operating the hydraulic pressure control mechanism 35 during stop or suspension of the engine 1. When the crankshaft 2 of the engine 1 is rotating, the brake system 34 is activated by an air intake vacuum (an intake manifold vacuum) developed in the engine 1. A mechanically-driven hydraulic pump (not shown) is coupled with the crankshaft 2 of the engine 1. When the crankshaft 2 of the engine 1 is rotating, a hydraulic working pressure for operating the hydraulic pressure control mechanism 35 is produced by the mechanically-driven hydraulic pump.

Regarding the parameters indirectly detected by specific ones of the above-indicated detecting means, there may be provided detecting means (detecting devices and sensors) which directly detect the parameters. For example, there may be provided a sensor for directly detecting the state of the lock-up clutch 16. The engine controlling means 19 includes a controlling means (a controlling device) for permitting and cutting off the supply of fuel to the engine 1, and a controlling means (a controlling device) for turning on and off an ignition device. The engine controlling means 19 is controlled by the control unit 17 to implement the cut-off of the fuel supply to the engine 1 and the resumption of the fuel supply thereto.

Figure 2:
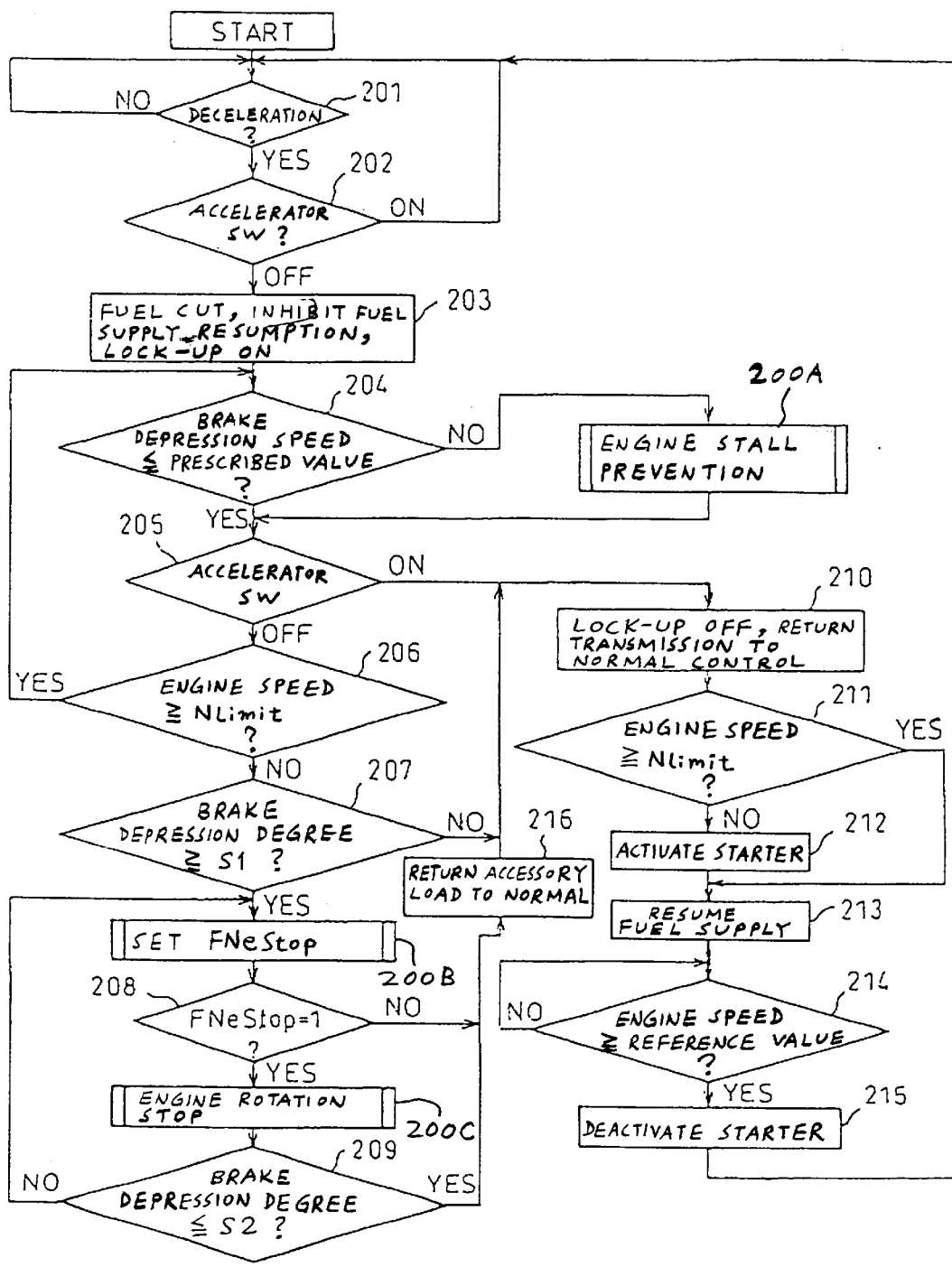
FIG. 2 is a flowchart of a main routine of a control program for an electronic control unit in FIG. 1.

The control unit 17 operates in accordance with a control program stored in its internal ROM. FIG. 2 is a flowchart of a main routine of the control program.

With reference to FIG. 2, a first step 201 of the main routine of the control program determines whether or not the vehicle is decelerating. Specifically, when the degree of depression of the accelerator pedal which is represented by the output signal from the detecting means 25 is zero and the vehicle acceleration represented by the output signal from the acceleration/deceleration detecting means 23 is equal to or smaller than a prescribed negative value, the step 201 determines that the vehicle is decelerating. Otherwise, the step 201 determines that the vehicle is not decelerating. When the vehicle is decelerating, the program advances from the step 201 to a step 202. When the vehicle is not decelerating, the step 201 is repeated.

The step 202 determines whether the accelerator pedal is depressed or undepressed, that is, whether the accelerator switch is in its ON position or its OFF position by referring to the output signal from the detecting means 25. When the accelerator pedal is undepressed, that is, when the accelerator switch is in its OFF position, the program advances from the step 202 to a step 203. Otherwise, the program returns from the step 202 to the step 201.

The step 203 controls the engine controlling means 19 to command the cut-off of fuel supply to the engine 1 and the inhibition of the resumption of fuel supply to the engine 1. As a result, an engine stop procedure is commenced. In addition, the step 203 controls the transmission controlling means 18 to set the lock-up clutch 16 of the automatic transmission apparatus 12 in its ON state (its engaged state). Thus, the crankshaft 2 of the engine 1 which does not generate torque as a result of the fuel cut-off is forcedly driven by the drive wheels 10 and the axles 11, and hence continues to rotate. The previously-mentioned control clutch may be used and controlled instead of the lock-up clutch 16. After the step 203, the program advances to a step 204.

The step 204 calculates the speed of depression of the brake pedal from the output signal of the brake depression degree detecting means 24. The step 204 compares the calculated speed of depression of the brake pedal with a prescribed value. When the calculated speed of depression of the brake pedal is equal to or lower than the prescribed value, the program advances from the step 204 to a step 205. Otherwise, the program advances from the step 204 to a subroutine 200A of the control program which is designed to execute an engine-stall preventing procedure. After the engine-stall preventing subroutine 200A, the program advances to the step 205.

The step 205 determines whether the accelerator pedal is depressed or undepressed, that is, whether the accelerator switch is in its ON position or its OFF position by referring to the output signal from the detecting means 25. When the accelerator pedal is undepressed, that is, when the accelerator switch is in its OFF position, the program advances from the step 205 to a step 206. Otherwise, the program advances from the step 205 to a step 210.

The step 206 derives the engine speed, that is, the rotational speed of the crankshaft 2, from the output signal of the detecting means 31. The step 206 compares the engine speed with a prescribed value Nlimit. When the engine speed is equal to or higher than the prescribed value Nlimit, the program returns from the step 206 to the step 204. Otherwise, the program advances from the step 206 to a step 207.

The step 210 and subsequent steps implement an engine restart procedure. The step 210 controls the transmission controlling means 18 to set the lock-up clutch 16 of the automatic transmission apparatus 12 in its OFF state (its disengaged state or its release state). In addition, the step 210 controls the transmission controlling means 18 to return the control of the transmission 14 in the automatic transmission apparatus 12 to a normal mode.

A step 211 following the step 210 derives the engine speed, that is, the rotational speed of the crankshaft 2, from the output signal of the detecting means 31. The step 211 compares the engine speed with the prescribed value Nlimit. When the engine speed is equal to or higher than the prescribed value Nlimit, the program advances from the step 211 to a step 213. Otherwise, the program advances from the step 211 to a step 212.

The step 212 controls the starter controlling means 20 to activate the starter motor 7. After the step 212, the program advances to the step 213.

The step 213 controls the engine controlling means 19 to resume the fuel supply to the engine 1. As result, the engine 1 is restarted. After the step 213, the program advances to a step 214.

The step 214 derives the engine speed, that is, the rotational speed of the crankshaft 2, from the output signal of the detecting means 31. The step 214 compares the engine speed with a predetermined reference value (equal to or greater than the prescribed value Nlimit). When the engine speed is equal to or higher than the predetermined reference value, the program advances from the step 214 to a step 215. Otherwise, the step 214 is repeated.

The step 215 controls the starter controlling means 20 to deactivate the starter motor 7. After the step 215, the program returns to the step 201.

Figure 3:
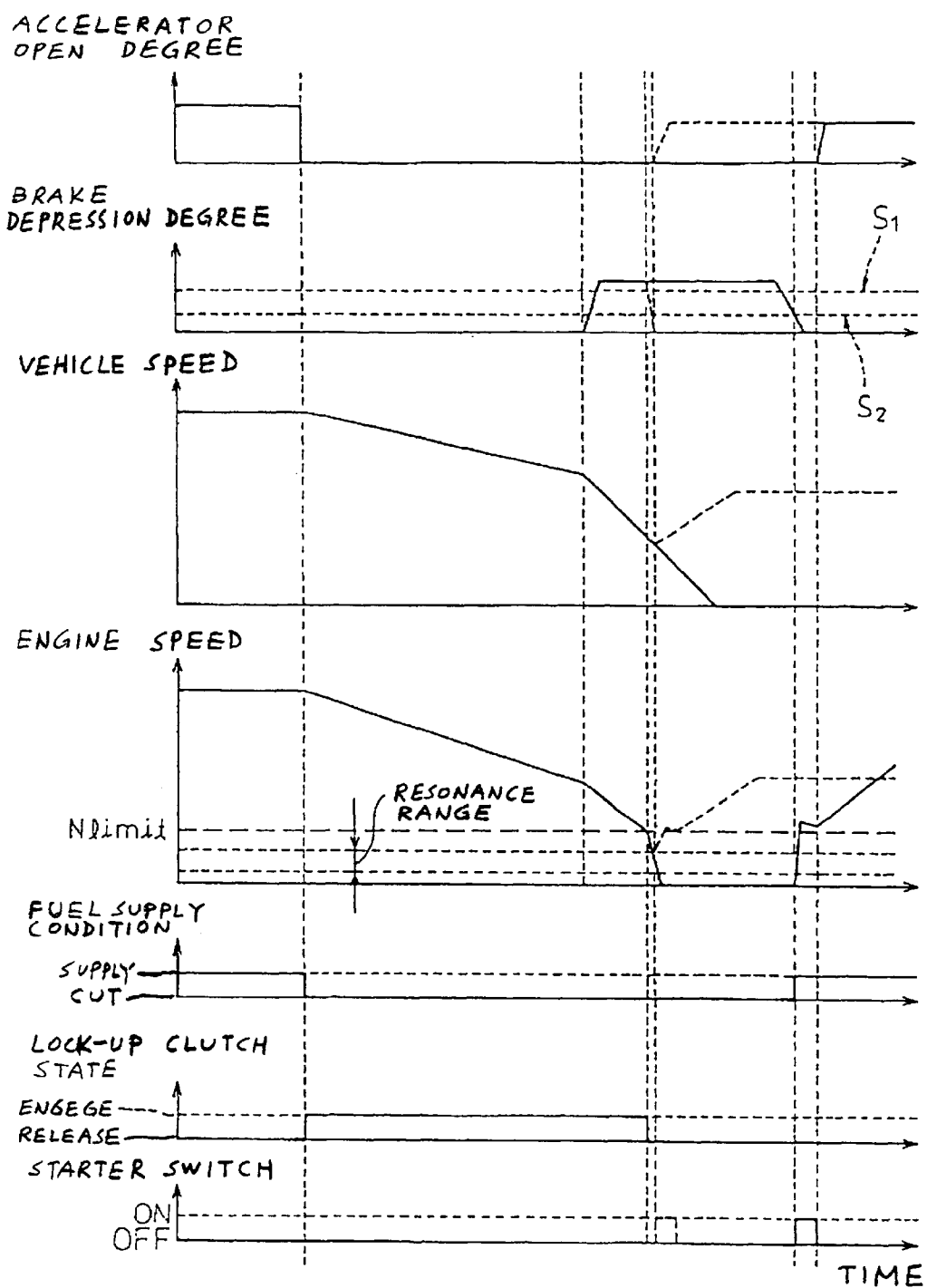
FIG. 3 is a time-domain diagram of a first example of conditions of various parameters which occur during the execution of an engine stop procedure and a subsequent engine restart procedure in the engine control apparatus of FIG. 1.

As shown in FIG. 3, the degree of depression of the accelerator pedal (the accelerator opening degree), the degree of depression of the brake pedal, the vehicle speed, the engine speed, the condition of fuel supply to the engine 1, the state of the lock-up clutch 16, and the state of the starter motor 7 vary in time domain during the execution of the engine stop procedure and the subsequent engine restart procedure. The engine speed passes through a resonance range before dropping to zero. When the engine speed is in the resonance range, resonance occurs between the engine 1 and the body of the vehicle so that great-amplitude vibration of the vehicle body is caused which discomforts vehicle occupants. Preferably, the prescribed value Nlimit is equal to the sum of the maximum speed value in the resonance range and an estimated decrease in the engine speed which occurs during a time interval (a delay) from the moment of the satisfaction of conditions for engine stop to the moment of actual start of the engine stopping control. Therefore, the prescribed value Nlimit is slightly greater than the maximum speed value in the resonance range. When the engine speed drops to the prescribed value Nlimit, a featuring control procedure is performed to enable the engine speed to quickly pass through the resonance range. Thus, it is possible to suppress the vibration of the vehicle body which occurs when the engine speed is in the resonance range. The featuring control procedure will be mentioned later.

As the fuel cut-off continues and the engine speed drops, the step 206 determines that the engine speed is lower than the prescribed value Nlimit (the engine speed drops across the prescribed value Nlimit and becomes close to the resonance range). In this case, when the vehicle is required to further decelerate, the crankshaft 2 is disconnected from the axles 11 and the engine 1 is promptly stopped or suspended to prevent the occurrence of resonance-caused uncomfortable vibration of the vehicle body. On the other hand, when the vehicle is required to travel, the fuel supply to the engine 1 is resumed and the engine speed is increased to prevent the occurrence of resonance-caused uncomfortable vibration of the vehicle body. The resumption of the fuel supply enables a requirement for vehicle reacceleration to be promptly met. The control unit 17 has the following features. The control unit 17 predicts whether the vehicle is required to stop or continue its travel on the basis of the degree of depression of the brake pedal. The control unit 17 performs a later control procedure in response to the result of the prediction.

With reference back to FIG. 2, the step 207 derives the degree of depression of the brake pedal from the output signal of the brake depression degree detecting means 24. The step 207 compares the degree of depression of the brake pedal with a first prescribed value (an engine rotation stop threshold value) S1. The first prescribed value S1 is equal to a predicted degree to which the brake pedal is depressed to stop the vehicle. For example, the first prescribed value S1 is chosen to overcome a creep torque generated when the accelerator pedal is undepressed. When the degree of depression of the brake pedal is equal to or greater than the first prescribed value S1, that is, when it is predicted that the vehicle is required to stop, the program advances from the step 207 to a subroutine 200B of the control program which is designed to set an engine rotation stop permission flag FNeStop. After the subroutine 200B, the program advances to a step 208. When the degree of depression of the brake pedal is smaller than the first prescribed value S1, that is, when it is predicted that the vehicle is required to continue its travel, the program advances from the step 207 to the step 210.

The step 208 refers to the engine rotation stop permission flag FNeStop set by the subroutine 200B. The step 208 determines whether or not the engine rotation stop permission flag FNeStop is "1". When the engine rotation stop permission flag FNeStop is "1", the program advances from the step 208 to a subroutine 200C of the control program which is designed to stop the rotation of the crankshaft 2 of the engine 1. The engine rotation stop (the crankshaft rotation stop) implemented by the subroutine 200C corresponds to automatic engine rotation stop. After the engine rotation stop subroutine 200C, the program advances to a step 209. When the engine rotation stop permission flag FNeStop is not "1", the program advances from the step 208 to a step 216.

The step 209 derives the degree of depression of the brake pedal from the output signal of the brake depression degree detecting means 24. The step 209 compares the degree of depression of the brake pedal with a second prescribed value (an engine restart threshold value) S2. The second prescribed value S2 is equal to or smaller than the first prescribed value S1. When the degree of depression of the brake pedal is greater than the second prescribed value S2, that is, when the vehicle is still required to stop, the program returns from the step 209 to the subroutine 200B to continue the execution of the engine rotation stop procedure. On the other hand, when the degree of depression of the brake pedal is equal to or smaller than the second prescribed value S2, that is, when the vehicle is now required to continue its travel, the program advances from the step 209 to the step 216.

Conditions of parameters during the execution of the engine stop procedure are denoted by the solid lines in FIG. 3. In the case where the control unit 17 confirms from the output signal of the detecting means 30 that the vehicle is in its parking state, the control unit 17 does not perform the automatic resumption of fuel supply and the restart of the engine 1 even when the degree of depression of the brake pedal is decreased thereafter.

In the case where the step 205 determines that the accelerator switch 25 is in its ON position (the accelerator pedal is depressed), it is thought that the requirement for vehicle stop is replaced by a requirement for continuance of vehicle travel or a requirement for vehicle reacceleration. Also, in the case where the step 207 determines that the degree of depression of the brake pedal is smaller than the first prescribed value S1, it is thought that the requirement for vehicle stop is replaced by a requirement for continuance of vehicle travel or a requirement for vehicle reacceleration. Furthermore, in the case where the step 209 determines that the degree of depression of the brake pedal is equal to or smaller than the second prescribed value S2, it is thought that the requirement for vehicle stop is replaced by a requirement for vehicle reacceleration.

As previously mentioned, when the step 205 determines that the accelerator switch 25 is in its ON position (the accelerator pedal is depressed), the program advances to the step 210. When the step 207 determines that the degree of depression of the brake pedal is smaller than the first prescribed value S1, the program advances to the step 210. When the step 209 determines that the degree of depression of the brake pedal is equal to or smaller than the second prescribed value S2, the program advances to the step 216. Also, when the step 208 determines that the engine rotation stop permission flag FNeStop is not "1", the program advances to the step 216. The step 216 controls the controlling means 21 and 22 to return the load caused by the accessories (the power generator 4 and the air-conditioner compressor 6) from a large value to a normal value. In general, before the execution of the step 216, the load caused by the accessories is set to the large value by the engine rotation stop subroutine 200C. After the step 216, the program advances to the step 210.

As previously mentioned, the step 210 controls the transmission controlling means 18 to set the lock-up clutch 16 of the automatic transmission apparatus 12 in its OFF state (its disengaged state or its release state). As a result, the continuance of forced rotation of the crankshaft 2 by the axles 11 is interrupted, and the crankshaft 2 is permitted to freely rotate. Thus, the crankshaft 2 is released from the axles 11. In addition, the step 210 controls the transmission controlling means 18 to return the control of the transmission 14 in the automatic transmission apparatus 12 to the normal mode. The step 211 following the step 210 compares the engine speed with the prescribed value Nlimit. When the engine speed is equal to or higher than the prescribed value Nlimit, the program advances from the step 211 to the step 213. Otherwise, the program advances from the step 211 to the step 212. The step 212 controls the starter controlling means 20 to activate the starter motor 7. Thus, a rotational force is transmitted from the starter motor 7 to the crankshaft 2 via the belt 8 so that the crankshaft 2 is rotated. After the step 212, the program advances to the step 213. The step 213 controls the engine controlling means 19 to resume the fuel supply to the engine 1. As a result, the engine 1 is restarted. Conditions of the parameters during the execution of the engine restart procedure are denoted by the solid lines in FIG. 3. In the case where the step 211 determines that the engine speed is equal to or higher than the prescribed value Nlimit, the step 212 is skipped so that the starter motor 7 remains inactive. In this case, the engine restart is implemented by only the resumption of the fuel supply to the engine 1.

The broken lines in FIG. 3 denote conditions of the parameters which occur in the case where the requirement for vehicle stop is replaced by the requirement for vehicle reacceleration when the engine speed drops to the prescribed value Nlimit. The control unit 17 predicts the occurrence of the requirement for vehicle reacceleration from the fact that the degree of depression of the brake pedal is decreased before the accelerator pedal is actually depressed. At that time, preparations for vehicle reacceleration are made. Accordingly, it is possible to execute reacceleration of the vehicle with a good response performance.

In the case where the engine speed drops to zero, when reacceleration of the vehicle is predicted, the starter motor 7 is activated for engine restart. Also, in the case where the engine speed is equal to or lower than the prescribed value Nlimit, when reacceleration of the vehicle is predicted, the starter motor 7 is activated for engine restart. There is a small time lag between the moment of the commencement of the engine restart control by the control unit 17 and the moment of the commencement of rotation of the starter motor 7. Since the prescribed value Nlimit is slightly greater than the maximum speed value in the resonance range, the engine speed is increased again by the starter motor 7 before or when dropping to the resonance range. Therefore, it is possible to prevent the occurrence of resonance-caused uncomfortable vibration of the vehicle body. The shaft of the starter motor 7 is connected to the crankshaft 2 via the power transmission mechanism 9 so that the starter motor 7 can drive the crankshaft 2 at any time. This design enables the engine 1 to be restarted before complete stop thereof.

As previously mentioned, when the degree of depression of the brake pedal becomes equal to or greater than the first prescribed value S1, the control unit 17 predicts that the vehicle is required to stop. In the case where the requirement for the vehicle stop is replaced by a requirement for vehicle reacceleration after the engine speed drops to zero or when the engine speed drops below the prescribed value Nlimit, the control unit 17 predicts the reacceleration of the vehicle from a change in the degree of depression of the brake pedal. At that time, the engine 1 is restarted, and the engine speed starts rising. In this way, preparations for reacceleration of the vehicle are made. Accordingly, it is possible to quickly meet the requirement for vehicle reacceleration.

Figure 4:
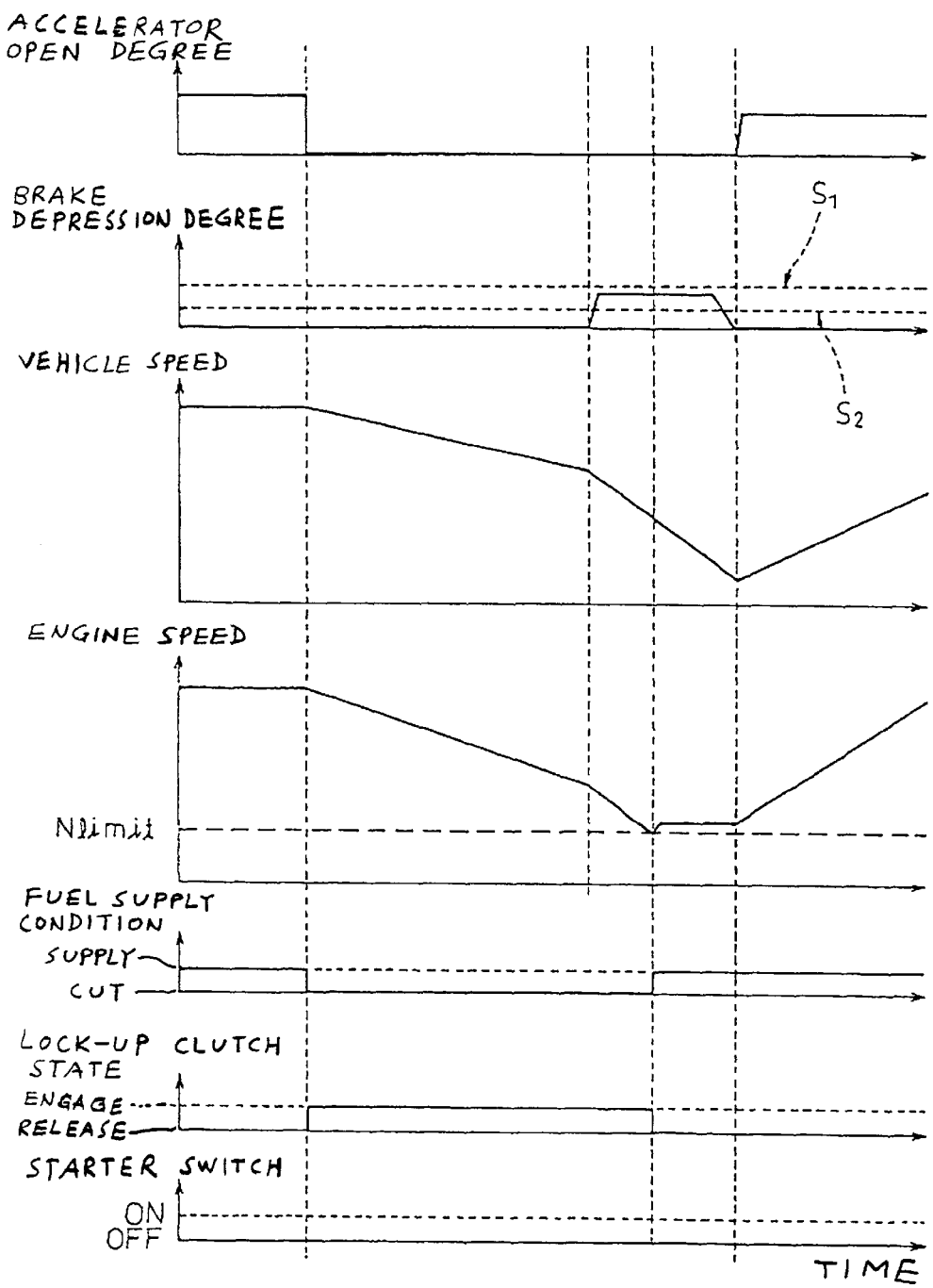
FIG. 4 is a time-domain diagram of a second example of conditions of various parameters which occur during the execution of an engine stop procedure and a subsequent engine restart procedure in the engine control apparatus of FIG. 1.

With reference to FIG. 4, in the case where the degree of depression of the brake pedal is smaller than the first prescribed value S1, the control unit 17 predicts that a requirement for vehicle stop is absent and a requirement for vehicle reacceleration will occur. Also in this case, when the step 201 in FIG. 2 detects deceleration of the vehicle from the output signal of the acceleration/deceleration detecting means 23 and the step 202 in FIG. 2 detects that the accelerator switch is in its OFF position (the degree of depression of the accelerator pedal is zero), the step 203 in FIG. 2 implements the cut-off of fuel supply to the engine 1 and sets the lock-up clutch 16 of the automatic transmission apparatus 12 in its ON state (its engaged state). As a result, both the vehicle speed and the engine speed drop. Thereafter, when the step 206 in FIG. 2 detects a drop in the engine speed blow the prescribed value Nlimit and the step 207 in FIG. 2 detects that the degree of depression of the brake pedal is smaller than the first prescribed value S1, the step 210 in FIG. 2 sets the lock-up clutch 16 of the automatic transmission apparatus 12 in its OFF state (its disengaged state or its release state). In addition, the step 213 in FIG. 2 resumes the fuel supply to the engine 1.

Thus, in the case where vehicle reacceleration is predicted from the degree of depression of the brake pedal, the lock-up clutch 16 is set in its OFF state (its disengaged state or its release state) and the fuel supply to the engine 1 is resumed before the engine speed drops to the resonance range. Therefore, it is possible to maintain the engine speed at a value (for example, an idle value) equal to or higher than the prescribed value Nlimit. Accordingly, resonance-caused uncomfortable vibration of the vehicle body is prevented from occurring while wasteful consumption of fuel is avoided. In addition, the engine speed can be quickly increased when the vehicle is required to reaccelerate. When the engine speed is equal to or higher than the prescribed value Nlimit, the step 212 in FIG. 2 is skipped so that the starter motor 7 remains inactive.

As previously mentioned, the step 204 compares the speed of depression of the brake pedal with the prescribed value. This comparison is to determine whether or not the brake pedal is abruptly depressed. When the speed of depression of the brake pedal is higher than the prescribed value, that is, when the brake pedal is abruptly depressed, the program advances to the engine-stall preventing subroutine 200A.

Figure 5:
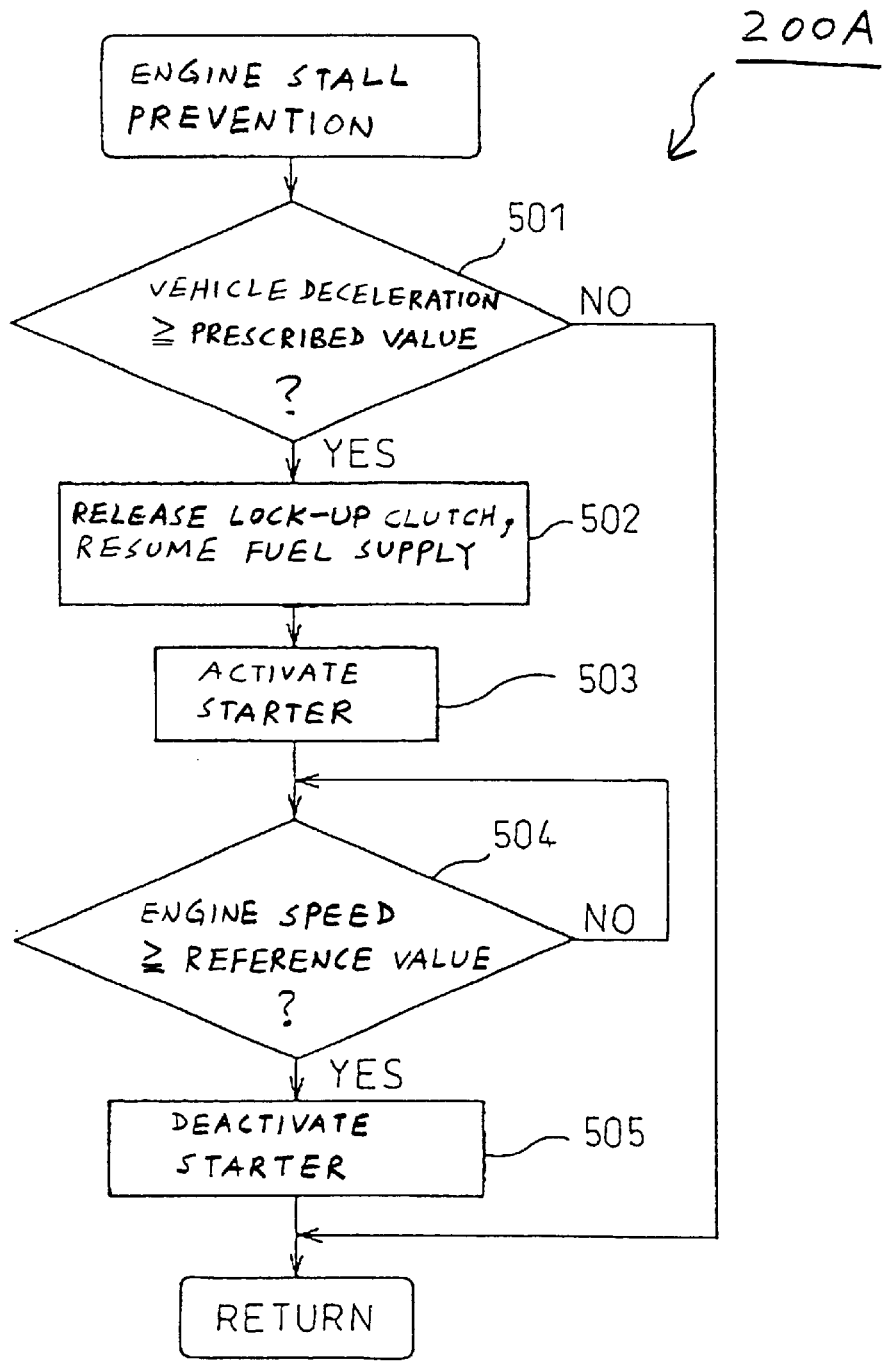
FIG. 5 is a flowchart of a first subroutine of the control program for the electronic control unit in FIG. 1.

As shown in FIG. 5, the engine-stall preventing subroutine 200A includes steps 501, 502, 503, 504, and 505. The step 501 follows the step 204 (see FIG. 2). The step 501 calculates the absolute value of vehicle deceleration represented by the output signal from the acceleration/deceleration detecting means 23. The step 501 determines whether or not the calculated absolute value of vehicle deceleration is greater than a prescribed value. When the absolute value of vehicle deceleration is greater than the prescribed value, the program advances from the step 501 to the step 502. Otherwise, the program exits from the engine-stall preventing subroutine 200A and then proceeds to the step 205 (see FIG. 2).

The step 502 controls the transmission controlling means 18 to set the lock-up clutch 16 of the automatic transmission apparatus 12 in its OFF state (its disengaged state or its release state). In addition, the step 502 controls the engine controlling means 19 to resume the fuel supply to the engine 1.

The step 503 which follows the step 502 controls the starter controlling means 20 to activate the starter motor 7. After the step 503, the program advances to the step 504.

The step 504 derives the engine speed, that is, the rotational speed of the crankshaft 2, from the output signal of the detecting means 31. The step 504 compares the engine speed with a predetermined reference value (greater than the prescribed value Nlimit). The predetermined reference value may be equal to that used in the step 214 in FIG. 2. When the engine speed is equal to or higher than the predetermined reference value, the program advances from the step 504 to the step 505. Otherwise, the step 504 is repeated.

The step 505 controls the starter controlling means 20 to deactivate the starter motor 7. After the step 505, the program exits from the engine-stall preventing subroutine 200A and then proceeds to the step 205 (see FIG. 2).

In the case where the step 501 determines that the absolute value of vehicle deceleration is equal to or smaller than the prescribed value, the step 503 is skipped so that the starter motor 7 remains inactive. As previously mentioned, the engine-stall preventing subroutine 200A is executed when the brake pedal is abruptly depressed. According to the engine-stall preventing subroutine 200A, the step 502 sets the lock-up clutch 16 in its OFF state (its disengaged state or its release state), and resumes the fuel supply to the engine 1. In addition, the step 503 activates the starter motor 7. Therefore, the engine 1 can be surely prevented from stalling when the brake pedal is abruptly depressed.

As previously mentioned, the subroutine 200B of the control program sets the engine rotation stop permission flag FNeStop which is referred to by the step 208 in FIG. 2. The subroutine 200B may be iteratively executed at a predetermined short period by timer-based interruption.

Figure 6:
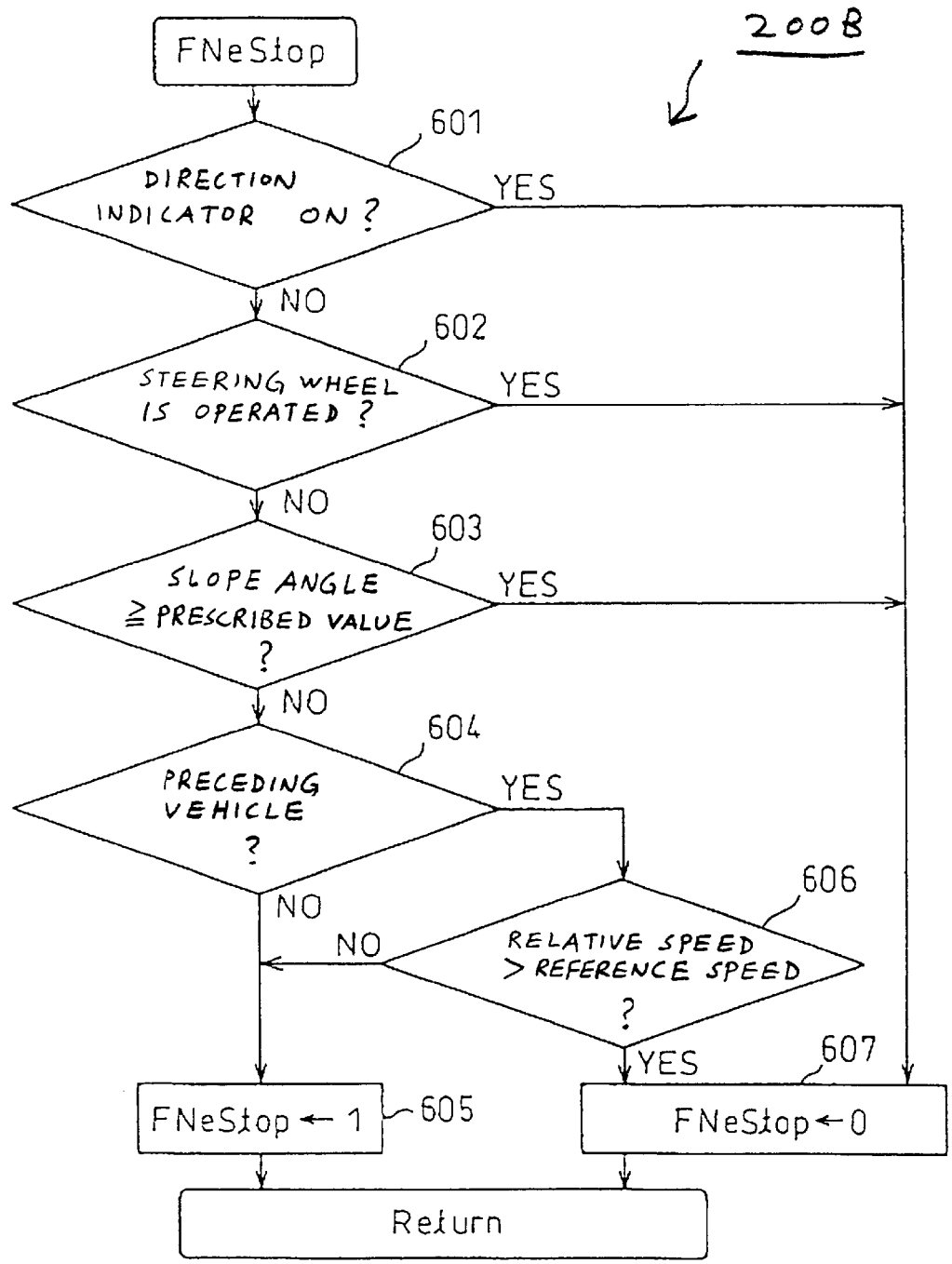
FIG. 6 is a flowchart of a second subroutine of the control program for the electronic control unit in FIG. 1.

With reference to FIG. 6, a first step 601 of the subroutine 200B determines whether or not one of the left-hand and right-hand winker switches is in its ON position by referring to the output signal from the detecting means 27. When one of the left-hand and right-hand winker switches is in its ON position, the program advances from the step 601 to a step 607. On the other hand, when none of the left-hand and right-hand winker switches is in its ON position, the program advances from the step 601 to a step 602.

The step 602 determines whether or not the vehicle steering wheel is turned from its neutral position by referring to the output signal from the steering angle detecting means 26. When the vehicle steering wheel is turned, the program advances from the step 602 to the step 607. Otherwise, the program advances from the step 602 to a step 603.

The step 603 determines whether or not the vehicle is on an upward slope in response to the output signal from the road surface slope angle detecting means 28. Specifically, the step 603 refers to the slope angle of the road surface which is represented by the output signal from the road surface slope angle detecting means 28. The step 603 compares the slope angle of the road surface with a predetermined reference value. When the slope angle of the road surface is greater than the predetermined reference value, that is, when the vehicle is on an upward slope, the program advances from the step 603 to the step 607. Otherwise, the program advances from the step 603 to a step 604.

The step 604 determines whether or not a preceding vehicle exists in a prescribed distance range in front of the present vehicle by referring to the output signal of the preceding-vehicle detecting means 29. When a preceding vehicle exists in the prescribed distance range, the program advances from the step 604 to a step 606. Otherwise, the program advances from the step 604 to a step 605.

The step 606 calculates the relative speed between the preceding vehicle and the present vehicle by processing the output signal from the preceding-vehicle detecting means 29. The step 606 compares the calculated relative speed with a predetermined reference speed. When the calculated relative speed is higher than the predetermined reference speed, the program advances from the step 606 to the step 607. Otherwise, the program advances from the step 606 to the step 605.

The step 605 sets the engine rotation stop permission flag FNeStop to "1". After the step 605, the program exits from the subroutine 200B and then returns to the main routine (see FIG. 2).

The step 607 sets the engine rotation stop permission flag FNeStop to "0". After the step 607, the program exits from the subroutine 200B and then returns to the main routine (see FIG. 2).

The steps 601, 602, 603, and 607 provide the following processes. When the vehicle is turning, the engine rotation stop permission flag FNeStop is set to "0". Also, when the vehicle is traveling on an upward slope, the engine rotation stop permission flag FNeStop is set to "0". The setting of the engine rotation stop permission flag FNeStop to "0" inhibits the execution of the engine rotation stop procedure. The steps 604, 606, and 607 provide the following processes. In general, when the step 606 determines that the calculated relative speed is higher than the predetermined reference speed, it is predicted that the present vehicle will be accelerated to follow the preceding vehicle. In this case, the engine rotation stop permission flag FNeStop is set to "0" to inhibit the execution of the engine rotation stop procedure.

The steps 601, 602, 603, 604, and 605 provide the following processes. The engine rotation stop permission flag FNeStop is set to "1" when all the following conditions (1), (2), and (3) are satisfied. The condition (1) is that the vehicle is not turning. The condition (2) is that the vehicle is not traveling on an upward slope. The condition (3) is that a preceding vehicle is absent from the prescribed distance range in front of the present vehicle. The setting of the engine rotation stop permission flag FNeStop to "1" permits the execution of the engine rotation stop procedure. The steps 605 and 606 provide the following processes. In general, when the step 606 determines that the calculated relative speed is equal to or lower than the predetermined reference speed, it is predicted that the present vehicle will be stopped to follow the preceding vehicle. In this case, the engine rotation stop permission flag FNeStop is set to "1" to permit the execution of the engine rotation stop procedure.

As previously mentioned, when the step 208 in FIG. 2 determines that the engine rotation stop permission flag FNeStop is "1", the program advances the engine rotation stop subroutine 200C of the control program.

Figure 7:
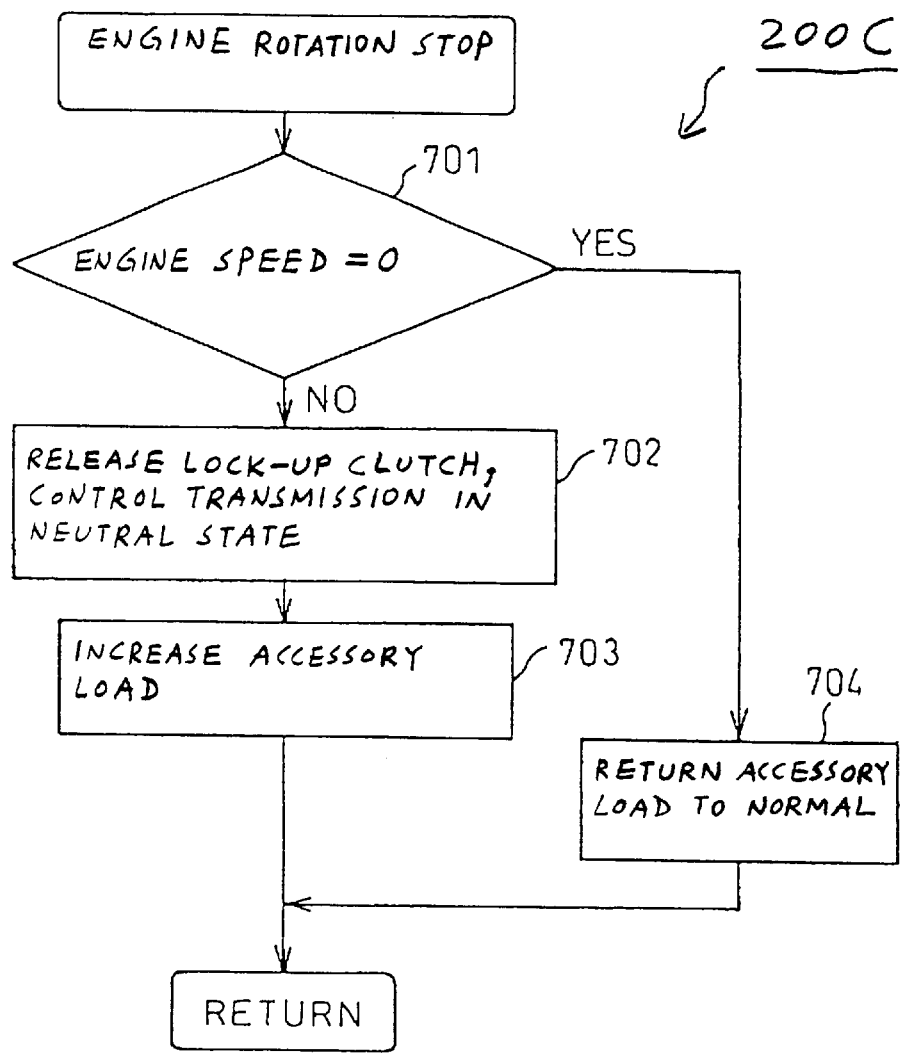
FIG. 7 is a flowchart of a third subroutine of the control program for the electronic control unit in FIG. 1.

As shown in FIG. 7, the engine rotation stop subroutine 200C includes steps 701, 702, 703, and 704. The step 701 follows the step 208 (see FIG. 2). The step 701 derives the engine speed, that is, the rotational speed of the crankshaft 2, from the output signal of the detecting means 31. The step 701 determines whether or not the engine speed is equal to zero. When the engine speed is equal to zero, the program advances from the step 701 to the step 704. Otherwise, the program advances from the step 701 to the step 702.

The step 702 controls the transmission controlling means 18 to set the lock-up clutch 16 of the automatic transmission apparatus 12 in its OFF state (its disengaged state or its release state), and to set the transmission 14 of the automatic transmission apparatus 12 in its neutral state. As a result, the crankshaft 2 is disconnected from the axles 11.

The step 703 which follows the step 702 controls the controlling means 21 and 22 to set the load caused by the accessories (the power generator 4 and the air-conditioner compressor 6) to a large value. The setting of the load to the large value enables the crankshaft 2 of the engine 1 to be quickly stopped. Thus, the rotational speed of the crankshaft 2 passes through the resonance range in a short time, and the occurrence of resonance-caused uncomfortable vibration of the vehicle body is suppressed. Specifically, the step 703 controls the controlling means 22 to activate the air-conditioner compressor 6 to increase the load caused thereby. The crankshaft 2 is effectively braked by the increased load caused by the air-conditioner compressor 6. In addition, the step 703 controls the controlling means 21 to raise the rate of power generation by the power generator 4 to increase the load caused thereby. The crankshaft 2 is effectively braked by the increased load caused by the power generator 4. After the step 703, the program exits from the engine rotation stop subroutine 200C and then advances to the step 209 (see FIG. 2).

A special braking device which can be controlled by the control unit 17 may be provided in connection with the crankshaft 2 of the engine 1. In this case, the step 703 activates the special braking device to stop the rotation of the crankshaft 2.

The step 704 controls the controlling means 21 and 22 to return the load caused by the accessories (the power generator 4 and the air-conditioner compressor 6) from the large value to a normal value. As result, the accessories (the power generator 4 and the air-conditioner compressor 6) are returned to their normally controlled states. After the step 704, the program exits from the engine rotation stop subroutine 200C and then advances to the step 209 (see FIG. 2).

During the execution of automatic stop (automatic suspension) of the engine 1, the vacuum pump 32 and the hydraulic pump 33 are driven by the battery 5 in response to commands from the control unit 17. Therefore, it is possible to generate a vacuum for operating the brake system 34. In addition, it is possible to generate a hydraulic working pressure for operating the hydraulic pressure control mechanism 35.

Basically, the cut-off of fuel supply to the engine 1 is carried out when the vehicle is decelerated. The fuel cut-off prevents wasteful consumption of fuel. At the same time, the crankshaft 2 of the engine 1 is connected to the axles 11. Thus, the rotation of the crankshaft 2 is maintained by the rotation of the axles 11 shortly before the vehicle completely stops. In this case, when the degree of depression of the brake pedal is equal to or greater than the first prescribed value S1, it is predicted that the vehicle is required to stop. Under the condition that the speed of depression of the brake pedal is equal to or lower than the prescribed value, when it is predicted that the vehicle is required to stop, the engine rotation stop procedure is executed. Thereafter, when the degree of depression of the brake pedal becomes equal to or smaller than the second prescribed value S2, it is predicted that the vehicle is required to reaccelerate. In this case, the supply of fuel to the engine 1 is resumed, and the crankshaft 2 is released from the axles 11. In addition, the starter motor 7 is activated provided that the engine speed is lower than the prescribed value Nlimit. Therefore, the crankshaft 2 of the engine 1 is caused to rotate at a given speed or higher. During the execution of the fuel cut-off, when the degree of depression of the brake pedal is smaller than the first prescribed value S1 from the beginning, it is predicted that the vehicle is required to reaccelerate. In this case, before the engine speed drops to the resonance range, the fuel supply to the engine 1 is resumed and the crankshaft 2 is released from the axles 11 while the starter motor 7 remains deactivated.

Second Embodiment

A second embodiment of this invention is similar to the first embodiment thereof except that the main routine of the control program for the control unit 17 is modified. The main routine of the control program in the second embodiment of this invention includes steps 810, 811, 812, 813, and 814 shown in FIG. 8 which replace the steps 210, 211, 212, and 213 (see FIG. 2).

Figure 8:
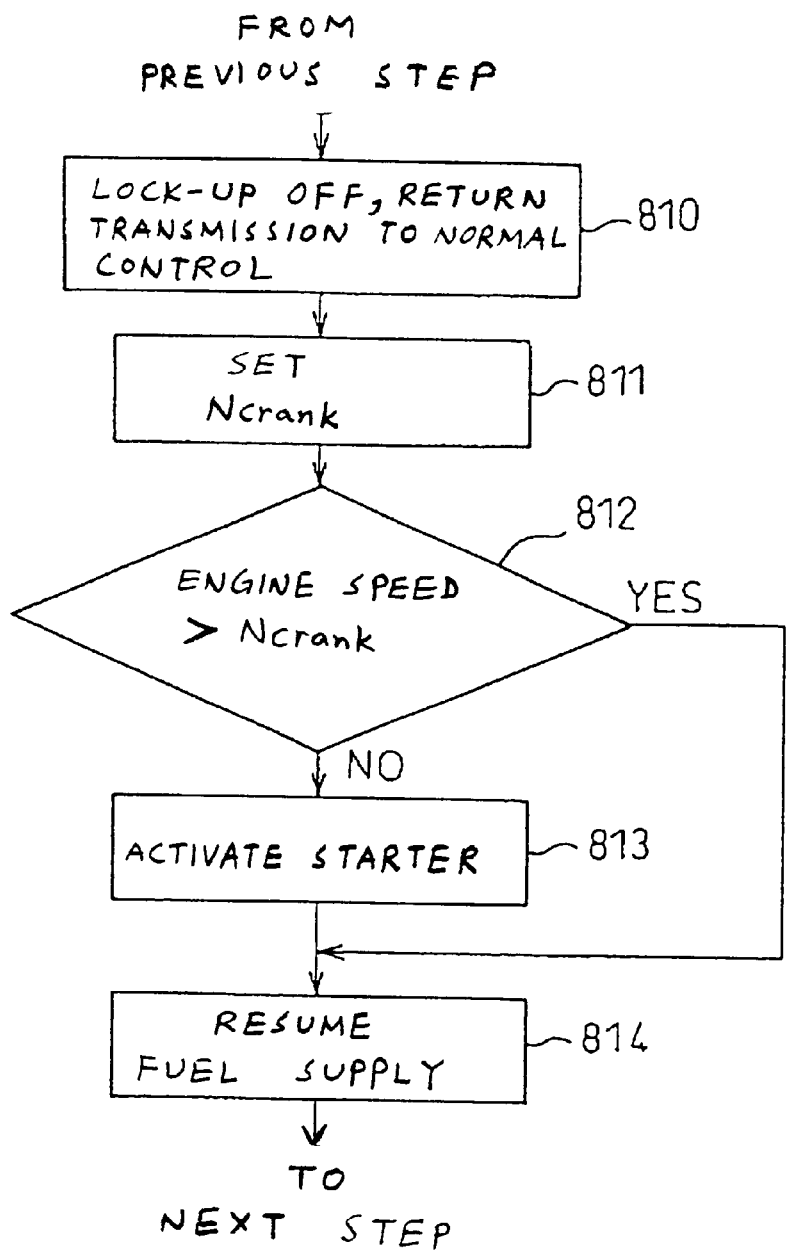
FIG. 8 is a flowchart of a portion of a main routine of a control program for an electronic control unit in a second embodiment of this invention.

With reference to FIG. 8, the step 810 follows the step 205, 207, or 216 (see FIG. 2). The step 810 controls the transmission controlling means 18 to set the lock-up clutch 16 of the automatic transmission apparatus 12 in its OFF state (its disengaged state or its release state). In addition, the step 810 controls the transmission controlling means 18 to return the control of the transmission 14 in the automatic transmission apparatus 12 to a normal mode. The step 810 is similar to the step 210 in FIG. 2.

The step 811 which follows the step 810 sets a reference value Ncrank for the engine speed (the rotational speed of the crankshaft 2). In the case where the fuel supply to the engine 1 is resumed after it is predicted that the vehicle is required to reaccelerate, the reference value Ncrank is used as an engine-speed threshold value in a decision as to whether or not the starter motor 7 should be activated.

Figure 9:
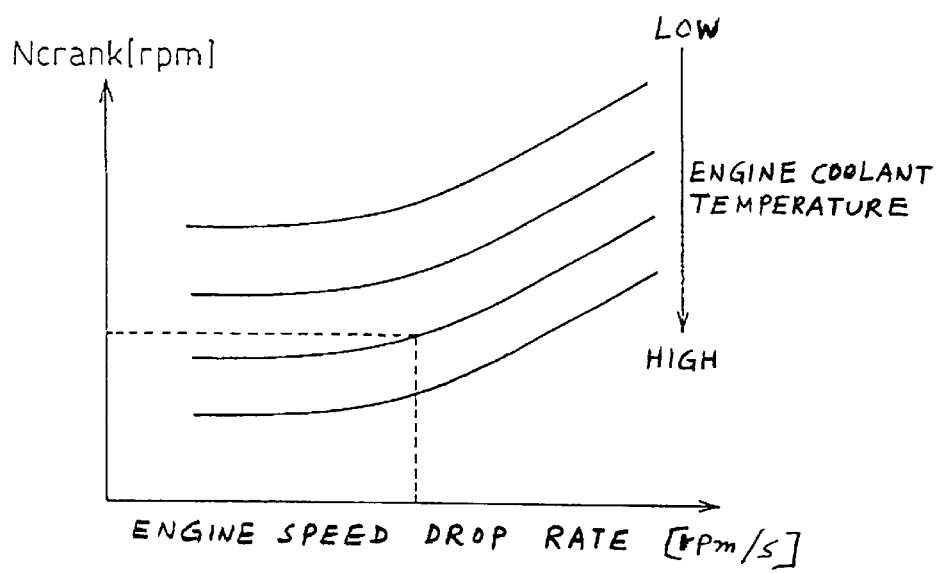
FIG. 9 is a diagram of a map denoting a relation among a reference value for engine speed, a rate of drop in the engine speed, and a temperature of engine coolant which is used by a step in FIG. 8.

The ROM in the control unit 17 stores data representing a map in which the reference value Ncrank is plotted as a function of parameters including the rate of the drop in the engine speed and the temperature of engine coolant. FIG. 9 shows an example of the map. The control unit 17 calculates the rate of the drop in the engine speed. The control unit 17 receives an output signal from an engine coolant temperature sensor (not shown). The control unit 17 derives the temperature of engine coolant from the output signal of the engine coolant temperature sensor. The step 811 accesses the map of FIG. 9 in response to the rate of the drop in the engine speed and the temperature of engine coolant, thereby deciding and setting the reference value Ncrank. Thus, the reference value Ncrank set by the step 811 depends on the rate of the drop in the engine speed and the temperature of engine coolant. The reference value Ncrank set by the step 811 corresponds to the lower limit of an engine speed range in which the engine 1 can be restarted without using the starter motor 7.

With reference back to FIG. 8, the step 812 which follows the step 811 derives the engine speed (the rotational speed of the crankshaft 2) from the output signal of the detecting means 31. The step 812 compares the engine speed with the reference value Ncrank set by the step 811. When the engine speed is equal to or lower than the reference value Ncrank, the program advances from the step 812 to the step 813. On the other hand, when the engine speed is higher than the reference value Ncrank, the program advances from the step 812 to the step 814.

The step 813 controls the starter controlling means 20 to activate the starter motor 7. The step 813 is similar to the step 212 in FIG. 2. After the step 813, the program advances to the step 814.

The step 814 controls the engine controlling means 19 to resume the fuel supply to the engine 1. As result, the engine 1 is restarted. The step 814 is similar to the step 213 in FIG. 2. After the step 814, the program advances to the step 214 (see FIG. 2).

Figure 10:
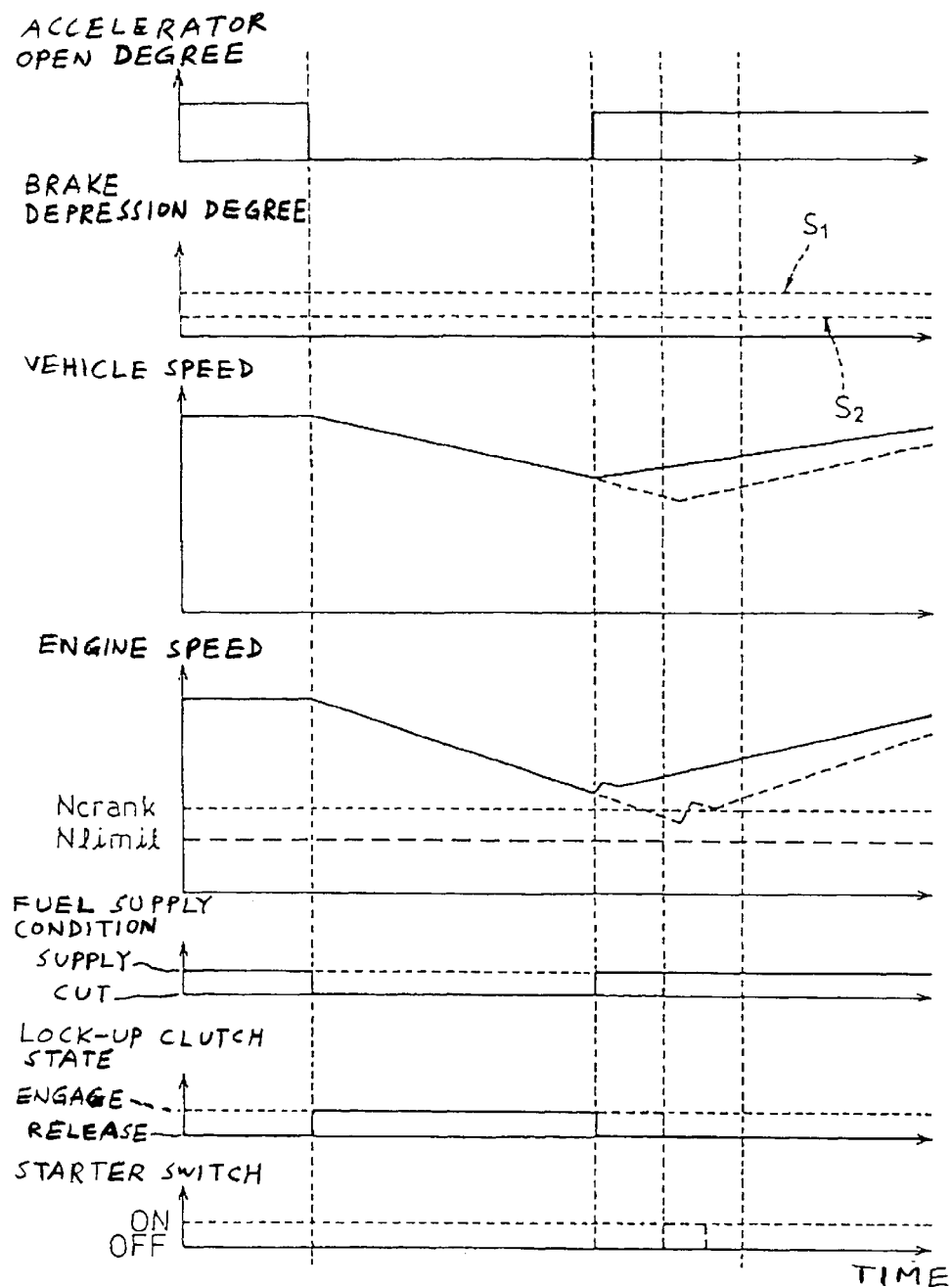
FIG. 10 is a time-domain diagram of an example of conditions of various parameters which occur during the execution of an engine stop procedure and a subsequent engine restart procedure in the second embodiment of this invention.

FIG. 10 shows an example of conditions of parameters during the execution of an engine stop procedure and a subsequent engine restart procedure responsive to depression of the accelerator pedal. With reference to FIG. 10, in the case where the degree of depression of the accelerator pedal becomes zero and the vehicle changes to a deceleration state, the cut-off of fuel supply to the engine 1 is executed and the lock-up clutch 16 is set in its engaged state. In the absence of the depression of the brake pedal, the engine speed naturally drops and becomes close to the prescribed value Nlimit. In this case, when the accelerator pedal is depressed to reaccelerate the vehicle, the engine restart procedure is executed. At that time, the current engine speed is compared with the reference value Ncrank to determine whether or not the starter motor 7 should be used.

Specifically, in the case where the accelerator pedal is depressed and the engine speed is higher than the reference value Ncrank at that time as denoted by the solid lines in FIG. 10, the fuel supply to the engine 1 is resumed and the lock-up clutch 16 is set in its disengaged state to restart the engine 1 while the starter motor 7 remains deactivated. On the other hand, when the engine speed is equal to or lower than the reference value Ncrank as denoted by the broken lines in FIG. 10, the starter motor 7 is activated to restart the engine 1 in addition to the execution of the resumption of the fuel supply to the engine 1 and the setting of the lock-up clutch 16 in its disengaged state.

A similar determination procedure is performed when a fuel cut-off state is replaced by an engine active state.

As previously mentioned, the shaft of the starter motor 7 is connected to the crankshaft 2 via the power transmission mechanism 9 so that the starter motor 7 can drive the crankshaft 2 at any time. This design enables the engine 1 to be restarted during rotation of the crankshaft 2.

Third Embodiment

Figure 11:
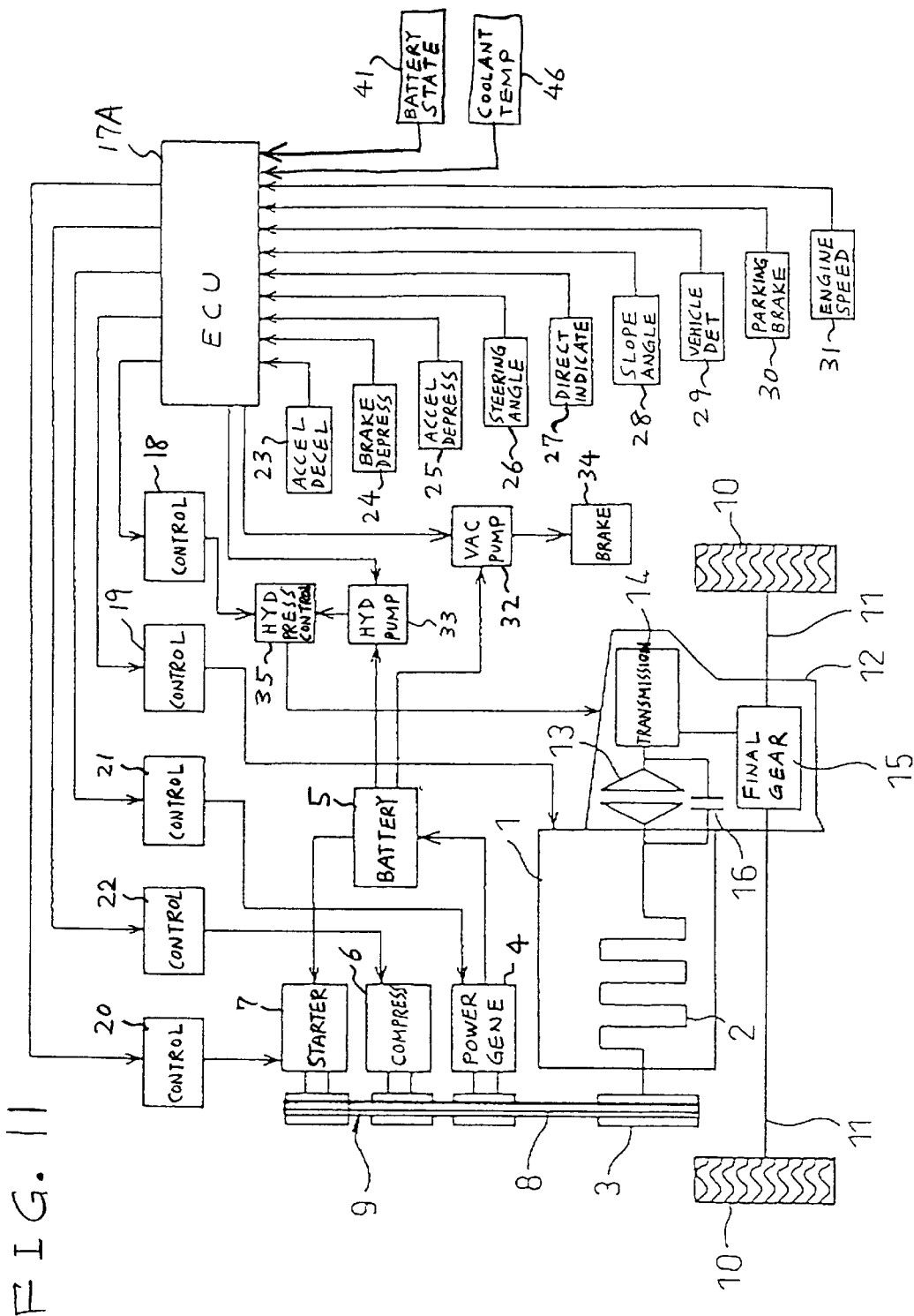
FIG. 11 is a diagram of a system including an engine control apparatus according to a third embodiment of this invention.

FIG. 11 shows a system including an engine control apparatus according to a third embodiment of this invention. The engine control apparatus in FIG. 11 is similar to that in FIG. 1 except for design changes mentioned hereafter.

The engine control apparatus in FIG. 11 includes an electronic control unit (ECU) 17A instead of the electronic control unit 17 (see FIG. 1). The engine control apparatus in FIG. 11 further includes detecting means (detecting devices) 41 and 46. The detecting means 41 acts to detect the amount of electric power remaining in the battery 5. An output signal from the detecting means 41 which represents the amount of electric power remaining in the battery 5 is fed to the control unit 17A. The detecting means 46 acts to detect a warm-up condition of the engine 1. The detecting means 46 contains, for example, a temperature sensor for detecting the temperature of engine coolant or engine oil. An output signal from the detecting means 41 which represents the engine warm-up condition is fed to the control unit 17A.

Figure 12:
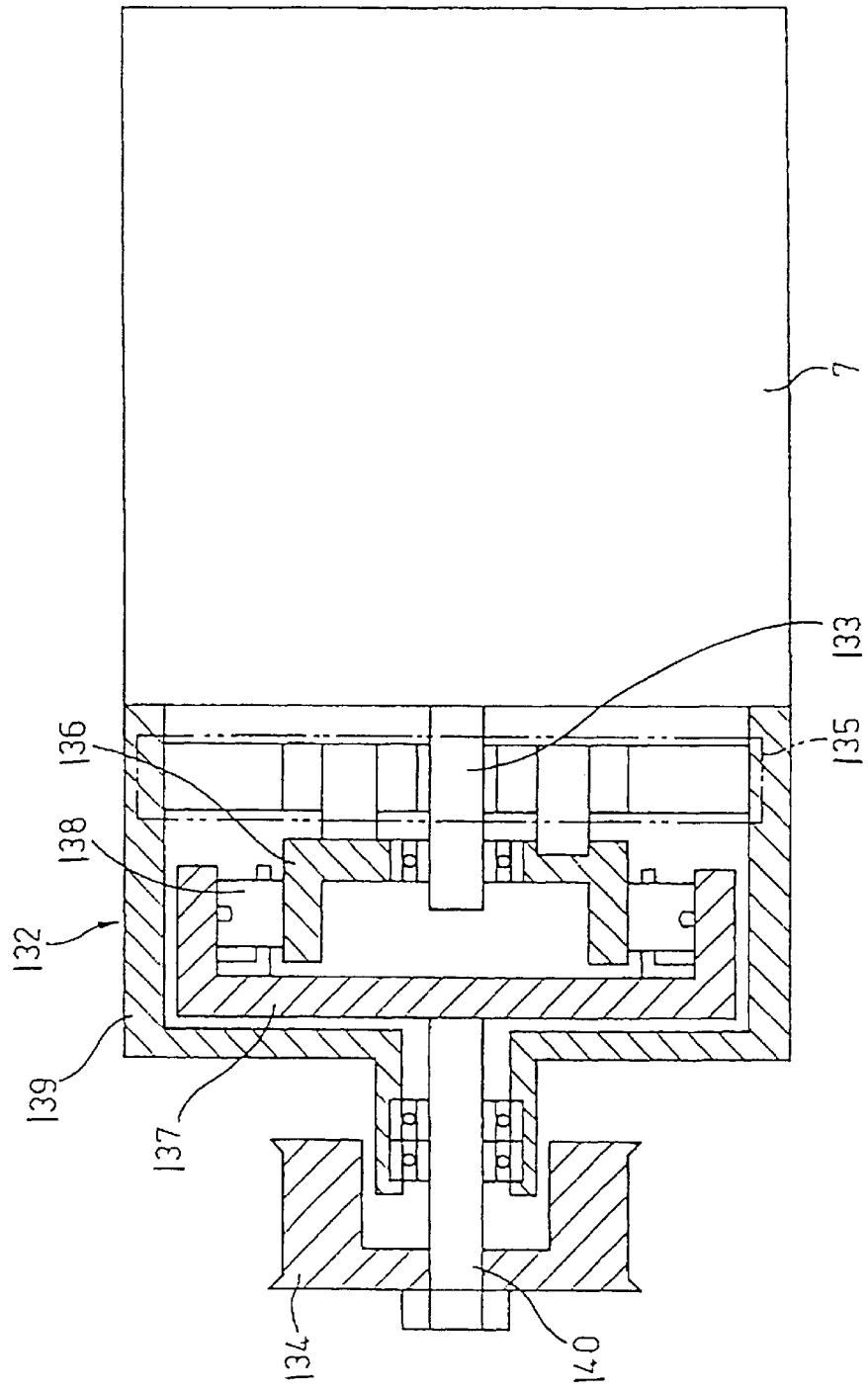
FIG. 12 is a sectional view of an one-way clutch associated with a starter motor in FIG. 11.

FIG. 12 shows a one-way clutch 132 which may be associated with the starter motor 7. The one-way clutch 132 is provided between the shaft (the output shaft) 133 of the starter motor 7 and the related pulley 134 which engages the belt 8 (see FIG. 11). The pulley 134 is connected with the crankshaft 2 of the engine 1 via the belt 8 and the crank pulley 3 (see FIG. 11). The one-way clutch 132 permits the starter motor 7 to drive the crankshaft 2 even during rotation of the crankshaft 2. The one-way clutch 132 inhibits the starter motor 7 from being driven by the crankshaft 2. In the case where the one-way clutch 132 is provided, the starter motor 7 can not be used as a power generator.

As shown in FIG. 12, the one-way clutch 132 includes a reduction gear device 135 of a planetary gear type, an inner wheel 136, an outer wheel 137, and a plurality of cams 138 rotatably supported between the inner wheel 136 and the outer wheel 137. Each of the cams 138 can move between a raised position and a lowered position. The one-way clutch 132 also includes a housing 139 containing the reduction gear device 135, the inner wheel 136, the outer wheel 137, and the cams 138. The inner wheel 136 is rotatably supported on the shaft 133 of the starter motor 7. The reduction gear device 135 is connected between the inner wheel 136 and the starter-motor shaft 133. As the starter-motor shaft 133 rotates, the reduction gear device 135 causes the inner wheel 136 to rotate at a reduced speed. The outer wheel 137 is mounted on an inner end of a shaft 140 rotatably supported by the housing 139. The pulley 134 is mounted on an outer end of the shaft 140.

When the control unit 17 commands the controlling means 20 to feed electric power from the battery 5 to the starter motor 7, the shaft 133 of the starter motor 7 rotates. During the rotation of the starter-motor shaft 133, the reduction gear device 135 causes the inner wheel 136 to rotate at a reduced speed. In this case, the inner wheel 136 serves as a driving side with respect to the outer wheel 137, and hence the cams 138 move to their raised positions and engage both the inner wheel 136 and the outer wheel 137. Thus, the inner wheel 136 and the outer wheel 137 are connected by the cams 138 so that the outer wheel 137 rotates together with the inner wheel 136. Accordingly, the rotational force is transmitted from the outer wheel 137 to the crankshaft 2 of the engine 1 via the shaft 140, the pulley 134, the belt 8, and the crank pulley 3. As a result, the engine 1 is started or restarted. After the engine 1 has been started or restarted, the rotational speed of the crankshaft 2 rises so that the outer wheel 137 will drive the inner wheel 136. In this case, the cams 138 return to their lowered positions, and the inner wheel 136 and the outer wheel 137 are disconnected from each other. Thus, the one-way clutch 132 falls into its racing state. When the inner wheel 136 and the outer wheel 137 are disconnected from each other (that is, when the one-way clutch 132 is in its racing state), the transmission of motive power therebetween is cut off.

Figure 13:
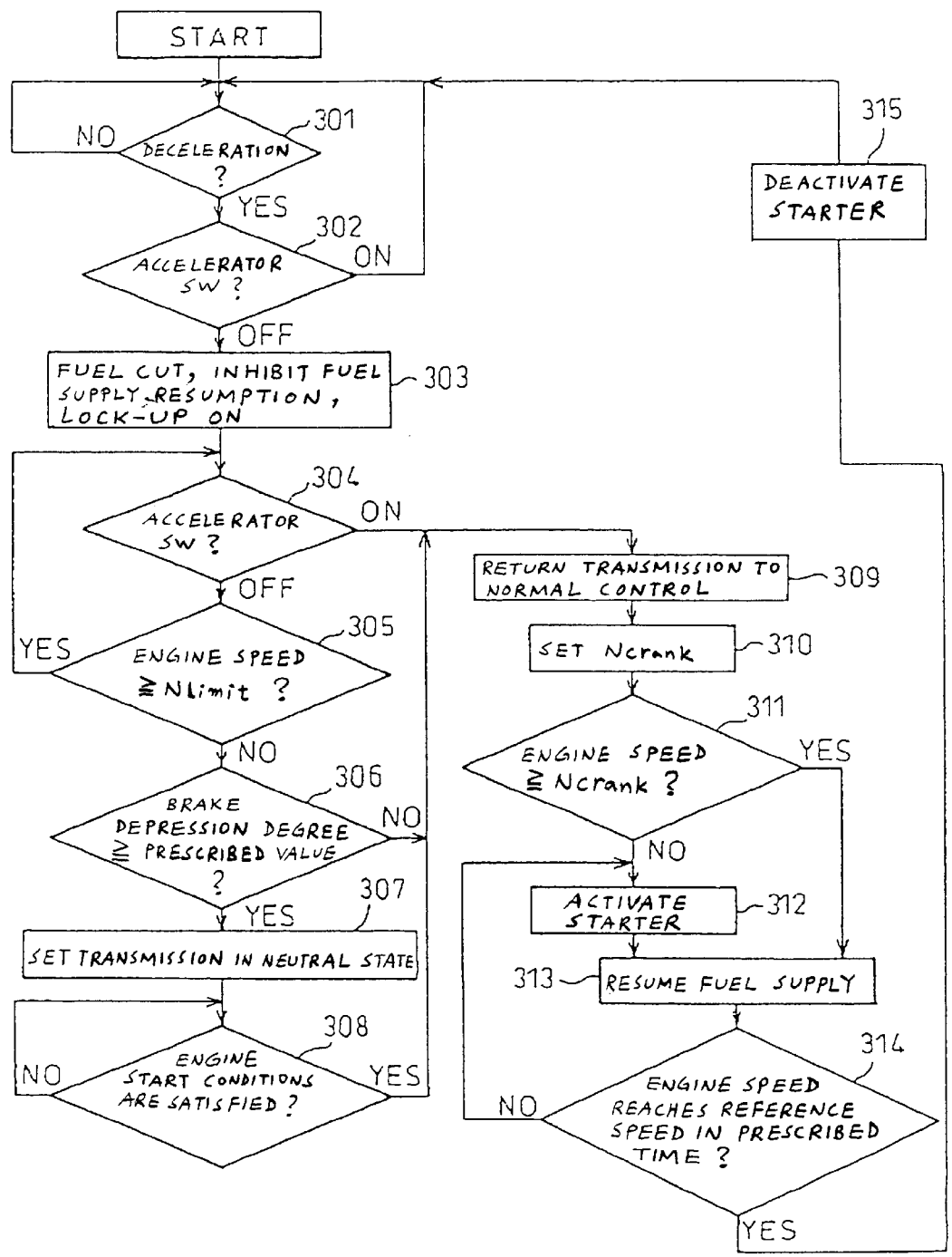
FIG. 13 is a flowchart of a main routine of a control program for an electronic control unit in FIG. 11.

The control unit 17A operates in accordance with a control program stored in its internal ROM. FIG. 13 is a flowchart of a main routine of the control program.

With reference to FIG. 13, a first step 301 of the main routine of the control program determines whether or not the vehicle is decelerating. Specifically, when the degree of depression of the accelerator pedal which is represented by the output signal from the detecting means 25 is zero and the vehicle acceleration represented by the output signal from the acceleration/deceleration detecting means 23 is equal to or smaller than a prescribed negative value, the step 301 determines that the vehicle is decelerating. Otherwise, the step 301 determines that the vehicle is not decelerating. When the vehicle is decelerating, the program advances from the step 301 to a step 302. When the vehicle is not decelerating, the step 301 is repeated.

The step 302 determines whether the accelerator pedal is depressed or undepressed, that is, whether the accelerator switch is in its ON position or its OFF position by referring to the output signal from the detecting means 25. When the accelerator pedal is undepressed, that is, when the accelerator switch is in its OFF position, the program advances from the step 302 to a step 303. Otherwise, the program returns from the step 302 to the step 301.

The step 303 controls the engine controlling means 19 to command the cut-off of fuel supply to the engine 1 and the inhibition of the resumption of fuel supply to the engine 1. In addition, the step 303 controls the transmission controlling means 18 to set the lock-up clutch 16 of the automatic transmission apparatus 12 in its ON state (its engaged state). Thus, the crankshaft 2 of the engine 1 which does not generate torque as a result of the fuel cut-off is driven by the drive wheels 10 and the axles 11, and hence continues to rotate. After the step 303, the program advances to a step 304.

The step 304 determines whether the accelerator pedal is depressed or undepressed, that is, whether the accelerator switch is in its ON position or its OFF position by referring to the output signal from the detecting means 25. When the accelerator pedal is undepressed, that is, when the accelerator switch is in its OFF position, the program advances from the step 304 to a step 305. Otherwise, the program advances from the step 304 to a step 309.

The step 305 derives the engine speed, that is, the rotational speed of the crankshaft 2, from the output signal of the detecting means 31. The step 305 compares the engine speed with a prescribed value Nlimit. When the engine speed is equal to or higher than the prescribed value Nlimit, the program returns from the step 305 to the step 304. Otherwise, the program advances from the step 305 to a step 306.

The step 306 derives the degree of depression of the brake pedal from the output signal of the brake depression degree detecting means 24. The step 306 compares the degree of depression of the brake pedal with a prescribed value (an engine rotation stop threshold value S1). The prescribed value is equal to a predicted degree to which the brake pedal is depressed to stop the vehicle. When the degree of depression of the brake pedal is equal to or greater than the prescribed value, the program advances from the step 306 to a step 307. Otherwise, the program advances from the step 306 to the step 309.

The step 307 controls the transmission controlling means 18 to set the lock-up clutch 16 of the automatic transmission apparatus 12 in its OFF state (its disengaged state or its release state). In addition, the step 307 controls the transmission controlling means 18 to set the transmission 14 of the automatic transmission apparatus 12 in its neutral state. As a result, the crankshaft 2 of the engine 1 is disconnected from the axles 11 of the vehicle wheels 10. After the step 307, the program advances to a step 308.

The step 308 determines whether or not predetermined engine starting conditions (predetermined engine restarting conditions) are satisfied. Specifically, the step 308 derives the degree of depression of the brake pedal from the output signal of the brake depression degree detecting means 24. The step 308 compares the degree of depression of the brake pedal with a predetermined reference value (an engine restart threshold value S2). The predetermined reference value is equal to or smaller than the prescribed value used in the step 306. When the degree of depression of the brake pedal is smaller than the predetermined reference value, that is, when the engine starting conditions are satisfied, the program advances from the step 308 to the step 309. On the other hand, when the degree of depression of the brake pedal is equal to or greater than the predetermined reference value, that is, when the engine starting conditions are not satisfied, the step 308 is repeated. In this case, the vehicle remains required to stop. Generally, the engine 1 completely stops while the step 308 is periodically repeated.

The engine starting conditions may correspond to conditions where the accelerator switch is changed to in its ON position. Also, the engine starting conditions may correspond to conditions where the amount of electric power remaining in the battery 5 drops to or below a reference value.

In the case where the control unit 17A confirms from the output signal of the detecting means 30 that the vehicle is in its parking state, the control unit 17A does not perform the automatic resumption of fuel supply and the restart of the engine 1 even when the degree of depression of the brake pedal is decreased thereafter. On the other hand, an engine restart procedure is executed when the requirement for vehicle stop is replaced by a requirement for vehicle reacceleration.

In the case where the step 304 determines that the accelerator switch 25 is in its ON position (the accelerator pedal is depressed), it is thought that the requirement for vehicle stop is replaced by a requirement for vehicle reacceleration. Also, in the case where the step 306 determines that degree of depression of the brake pedal is smaller than the prescribed value, it is thought that the requirement for vehicle stop is replaced by a requirement for continuance of vehicle travel or a requirement for vehicle reacceleration. Furthermore, in the case where the step 308 determines that the engine starting conditions (the engine restarting conditions) are satisfied or that the degree of depression of the brake pedal is smaller than the predetermined reference value, it is thought that the requirement for vehicle stop is replaced by a requirement for vehicle reacceleration. In these cases, the program advances to the step 309.

The step 309 controls the transmission controlling means 18 to set the lock-up clutch 16 of the automatic transmission apparatus 12 in its OFF state (its disengaged state or its release state). As a result, the crankshaft 2 of the engine 1 becomes free to rotate. In addition, the step 309 controls the transmission controlling means 18 to return the control of the transmission 14 in the automatic transmission apparatus 12 to a normal mode.

A step 310 following the step 309 sets a reference value Ncrank for the engine speed (the rotational speed of the crankshaft 2 of the engine 1). In the case where the fuel supply to the engine 1 is resumed after it is predicted that the vehicle is required to reaccelerate, the reference value Ncrank is used as an engine-speed threshold value in a decision as to whether or not the starter motor 7 should be activated.

The ROM in the control unit 17A stores data representing a map in which the reference value Ncrank is plotted as a function of parameters including the rate of the drop in the engine speed and the temperature of engine coolant. An example of the map is similar to that in FIG. 9. The control unit 17A calculates the rate of the drop in the engine speed. The control unit 17A derives the temperature of engine coolant from the output signal of the detecting means 46. The step 310 accesses the map of FIG. 9 in response to the rate of the drop in the engine speed and the temperature of engine coolant, thereby deciding and setting the reference value Ncrank. Thus, the reference value Ncrank set by the step 310 depends on the rate of the drop in the engine speed and the temperature of engine coolant. The reference value Ncrank set by the step 310 corresponds to the lower limit of an engine speed range in which the engine 1 can be restarted without using the starter motor 7. The temperature of engine coolant may be replaced by the temperature of engine oil. The reference value Ncrank may also depend on the engine load derived from an output signal of an engine load sensor.

A step 311 subsequent to the step 310 derives the engine speed (the rotational speed of the crankshaft 2) from the output signal of the detecting means 31. The step 311 compares the engine speed with the reference value Ncrank set by the step 310. When the engine speed is equal to or higher than the reference value Ncrank, the program advances from the step 311 to a step 313. Otherwise, the program advances from the step 311 to a step 312.

The step 312 controls the starter controlling means 20 to activate the starter motor 7. After the step 312, the program advances to the step 313.

The step 313 controls the engine controlling means 19 to resume the fuel supply to the engine 1. As result, the engine 1 is restarted. After the step 313, the program advances to a step 314.

The step 314 derives the engine speed, that is, the rotational speed of the crankshaft 2, from the output signal of the detecting means 31. The step 314 compares the engine speed with a predetermined reference value (equal to or greater than the reference value Ncrank). The step 314 measures the time elapsed from the moment of the activation of the starter motor 7 by the step 312. In the case where the engine speed has reached the predetermined reference value in a prescribed time from the moment of the activation of the starter motor 7, the program advances from the step 314 to a step 315. Otherwise, the program returns from the step 314 to the step 312. In this case, the activation of the starter motor 7 is repeated.

The step 315 controls the starter controlling means 20 to deactivate the starter motor 7. After the step 315, the program returns to the step 301.

Figure 14:
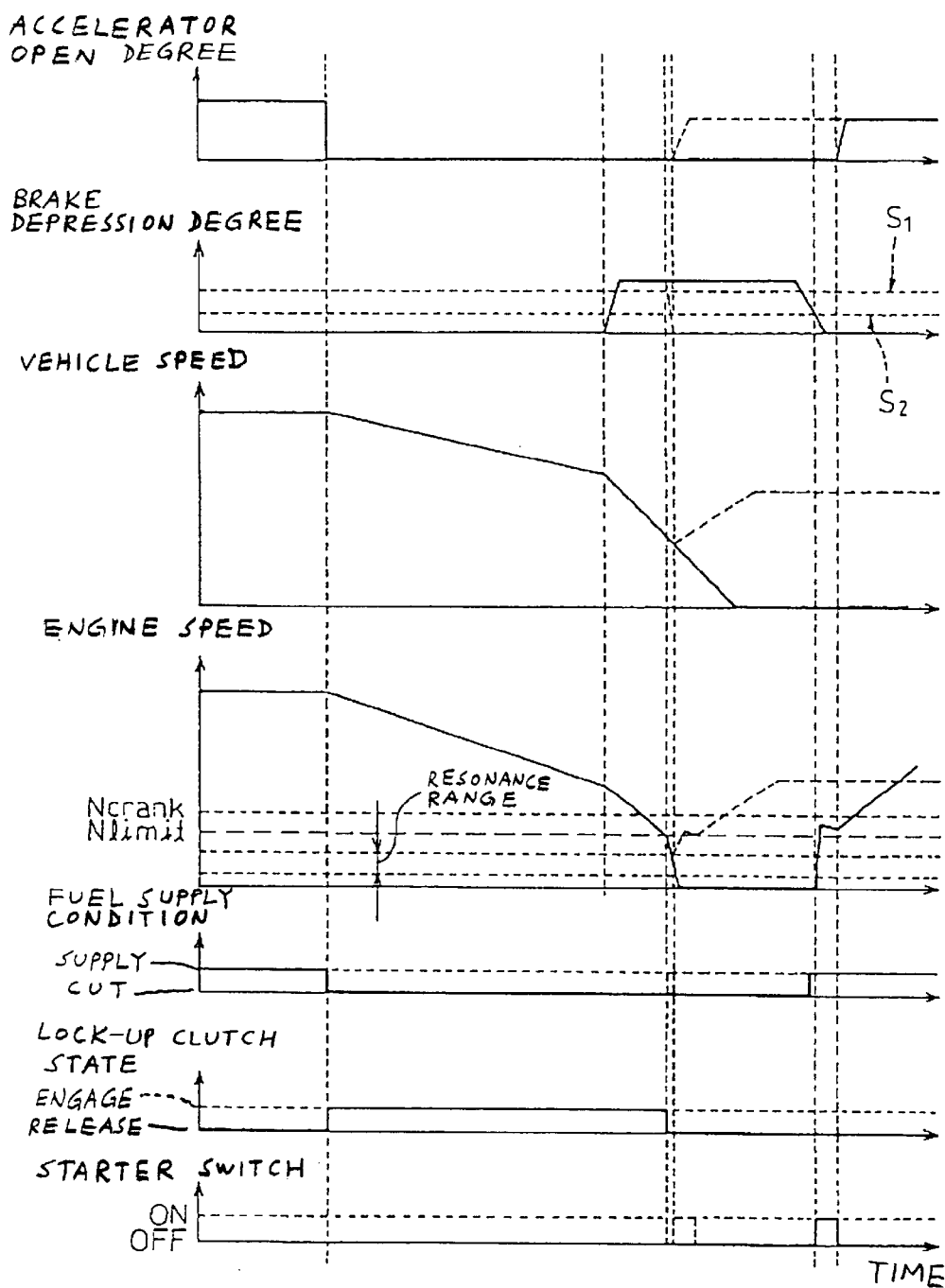
FIG. 14 is a time-domain diagram of an example of conditions of various parameters which occur during the execution of an engine stop procedure and a subsequent engine restart procedure in the engine control apparatus of FIG. 11.

FIG. 14 shows an example of conditions of parameters during the execution of an engine stop procedure and a subsequent engine restart procedure responsive to a prediction about a requirement for vehicle reacceleration. The solid lines in FIG. 14 denote the case where a requirement for vehicle reacceleration is so delayed that the engine 1 completely stops. In general, when the engine speed (the rotational speed of the crankshaft 2 of the engine 1) drops across the prescribed value Nlimit, the transmission 14 is set in its neutral state and the lock-up clutch 16 is set in its OFF state to avoid resonance between the engine 1 and the body of the vehicle. Thereafter, in the case where the degree of depression of the brake pedal is smaller than the prescribed value while the output signal of the detecting means 30 does not indicate that the vehicle is in its parking state, the control unit 17A predicts that the vehicle will be required to reaccelerate. In this case, the control unit 17A activates the starter motor 7 and resumes the fuel supply to the engine 1. As a result, the engine 1 is restarted, and the engine speed rises to an idle value (slightly above the prescribed value Nlimit). Thereafter, when the accelerator pedal is depressed, the rate of fuel injection into the engine 1 is increased and the engine speed quickly rises from the idle value.

The broken lines in FIG. 14 denote the case where the degree of depression of the brake pedal is decreased and hence a requirement for vehicle reacceleration is predicted while the engine speed (the rotational speed of the crankshaft 2 of the engine 1) is higher than zero. The engine speed is lower than the reference value Ncrank. Accordingly, the control unit 17A activates the starter motor 7 and resumes the fuel supply to the engine 1. As a result, the engine 1 is restarted.

Conditions of parameters during the execution of an engine stop procedure and a subsequent engine restart procedure responsive to depression of the accelerator pedal are similar to those in FIG. 10. Specifically, in the case where the degree of depression of the accelerator pedal becomes zero and the vehicle changes to a deceleration state, the cut-off of fuel supply to the engine 1 is executed and the lock-up clutch 16 is set in its ON state (its engaged state). In the absence of the depression of the brake pedal, the engine speed naturally drops and becomes close to the prescribed value Nlimit. In this case, when the accelerator pedal is depressed to reaccelerate the vehicle, the engine restart procedure is executed. At that time, the current engine speed is compared with the reference value Ncrank to determine whether or not the starter motor 7 should be used.

In more detail, when the accelerator pedal is depressed and the engine speed is higher than the reference value Ncrank at that time, the fuel supply to the engine 1 is resumed and the lock-up clutch 16 is set in its OFF state (its disengaged state) to restart the engine 1 while the starter motor 7 remains deactivated. On the other hand, when the engine speed is equal to or lower than the reference value Ncrank, the starter motor 7 is activated to restart the engine 1 in addition to the execution of the resumption of the fuel supply to the engine 1 and the setting of the lock-up clutch 16 in its OFF state (its disengaged state). Such circumstances occur when depression of the accelerator pedal is so late that the engine speed drops to or below the reference value Ncrank.

In this way, the engine 1 is restarted. When the engine 1 has been restarted, the engine speed reaches an idle value. Thus, a requirement for vehicle reacceleration can be promptly met. The one-way clutch 132 enables the engine restart procedure to be executed even when the crankshaft 2 is rotating. The execution of the engine restart procedure results in a rise in the engine speed (the rotational speed of the crankshaft 2). When the engine speed increases to or above a specified value, the one-way clutch 132 falls into its racing state. Accordingly, it is possible to avoid high-speed drive of the starter motor 7 by the crankshaft 2 which might damage the starter motor 7.

Fourth Embodiment

Figure 15:
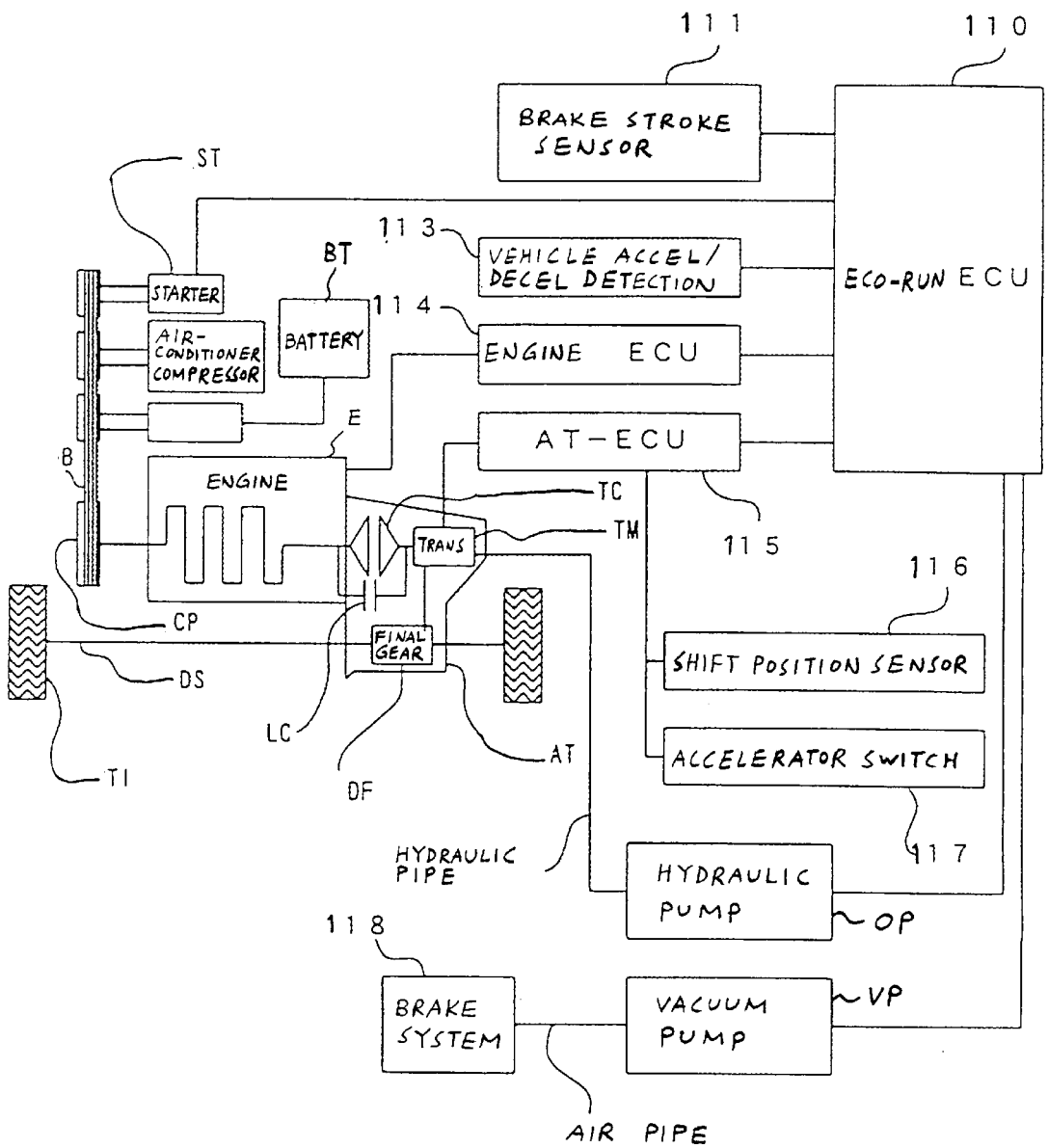
FIG. 15 is a diagram of a system including an engine control apparatus according to a fourth embodiment of this invention.

FIG. 15 shows a system including an engine control apparatus according to a fourth embodiment of this invention. The system of FIG. 15 is applied to a vehicle such as an automotive vehicle. The engine control apparatus in the system is an engine stopping and starting apparatus or an engine suspending and restarting apparatus.

With reference to FIG. 15, the vehicle is provided with an engine E, an engine starter ST, an automatic transmission AT, and a brake system 118. The engine E has a crankshaft (an output shaft) on which a crank pulley CP is mounted. The starter ST is connected via a belt B to the crank pulley CP. The automatic transmission AT is connected to the output shaft of the engine E.

The system of FIG. 15 includes an electronic control unit (ECU) 110 for executing an idle stop procedure. The control unit 110 is referred to as the eco-run ECU 110 hereafter. The eco-run ECU 110 includes a combination of a CPU, a ROM, a RAM, an input/output interface, and a timer. Analog-to-digital converters and digital-to-analog converters are contained in the input/output interface. The eco-run ECU 110 operates in accordance with a control program stored in its internal ROM.

The eco-run ECU 110 is electrically connected with the starter ST. The eco-run ECU 110 can selectively activate and deactivate the starter ST.

Also, the eco-run ECU 110 is electrically connected with a brake stroke sensor 111, an acceleration/deceleration detecting means (an acceleration/deceleration detecting device) 113, an engine ECU 114, an AT-ECU 115, an electrically-driven hydraulic pump OP, and an electrically-driven vacuum pump VP. The brake stroke sensor 111 detects the degree of depression of a brake pedal in the vehicle. An output signal of the brake stroke sensor 111 which represents the degree of depression of the brake pedal is fed to the eco-run ECU 110. The acceleration/deceleration detecting means 113 detects the acceleration and deceleration of the vehicle. An output signal of the acceleration/deceleration detecting means 113 which represents the acceleration and deceleration of the vehicle is fed to the eco-run ECU 110. The engine ECU 114 controls the engine E. The eco-run ECU 110 can communicate with the engine ECU 114. The AT-ECU 115 controls the automatic transmission AT. The eco-run ECU 110 can communicate with the AT-ECU 115. During the stop or suspension of the engine E, the hydraulic pump OP acts to generate a hydraulic pressure necessary to operate the automatic transmission AT. During the stop or suspension of the engine E, the vacuum pump VP acts to generate a vacuum necessary to operate the brake system 118. The eco-run ECU 110 is designed to automatically stop (suspend) and restart the engine E in response to the acceleration and deceleration of the vehicle, the braking operation by a vehicle driver, the operating conditions of the engine E, and the operating conditions of the automatic transmission AT.

The engine ECU 114 is electrically connected with sensors including an engine speed sensor (not shown) and an intake pipe pressure sensor or an intake manifold pressure sensor (not shown). The engine speed sensor detects the rotational speed of the crankshaft of the engine E which is referred to as the engine speed. An output signal of the engine speed sensor which represents the engine speed is fed to the engine ECU 114. The intake pipe pressure sensor detects the pressure in an intake pipe system (an intake manifold) leading to the cylinders of the engine E. An output signal of the intake pipe pressure sensor which represents the intake pipe pressure is fed to the engine ECU 114. Output signals of the other sensors are also fed to the engine ECU 114. The engine ECU 114 operates in accordance with a control program stored in its internal ROM. According to the control program, the engine ECU 114 generates control signals for the starter ST, an igniter (not shown), and fuel injection valves (not shown) in response to the output signals of the sensors. The control signals are fed via drive circuits (not shown) to the starter ST, the igniter, and the fuel injection valves. The control signal for the starter includes a starter drive signal. The control signal for the igniter includes a spark cut-off signal and a spark signal (a spark permission signal). The control signal for the fuel injection valves includes a fuel cut-off signal and a fuel injection signal (a fuel supply permission signal).

As previously mentioned, the starter ST is connected via the belt B to the crankshaft of the engine E. Thus, even in the case where the crankshaft is still rotating after an engine stop procedure is carried out, the starter ST can crank the engine E. Accordingly, the engine E can be restarted without waiting for complete stop of the crankshaft.

The AT-ECU 115 is electrically connected with sensors including a shift position sensor 116 and an accelerator switch 117. The vehicle is provided with a shift lever manually operated by the vehicle driver. The shift lever can be changed among shift positions corresponding to a P (parking) range, an R (reverse) range, an N (neutral) range, a D (drive) range, a 2 (second) range, and an L (low) range respectively. The shift position sensor 116 is associated with the shift lever. The shift position sensor 116 detects the current position of the shift lever. In other words, the shift position sensor 116 detects which of the P, R, N, D, 2, and L ranges is currently selected. The shift position sensor 116 informs the AT-ECU 115 which of the P, R, N, D, 2, and L ranges is currently selected. The accelerator switch 117 is associated with an accelerator pedal in the vehicle. The accelerator switch 117 detects whether or not the accelerator pedal is depressed. The accelerator switch 117 informs the AT-ECU 115 whether or not the accelerator pedal is depressed. The AT-ECU 115 controls the automatic transmission AT in response to the information fed from the shift position sensor 116 and the accelerator switch 117.

The automatic transmission AT includes a transmission TM, a torque converter TC, a lock-up clutch LC, and a final-stage reduction gear device DF. The torque converter TC is provided between the transmission TM and the output shaft of the engine E. The torque converter TC acts to convert the output torque of the engine E and apply the conversion-resultant torque to the transmission TM. The lock-up clutch LC can be changed between an engaged state and a disengaged state (an ON state and an OFF state). The disengaged state is also referred to as the release state. The lock-up clutch LC directly connects the input side and the output side of the torque converter TC to each other when assuming its engaged state (its ON state). The input side and the output side of the torque converter TC rotate together when being directly connected by the lock-up clutch LC. When the lock-up clutch LC assumes its disengaged state (its OFF state or its release state), the input side and the output side of the torque converter TC move out of direct connection. The transmission TM is followed by the final-stage reduction gear device DF. The final-stage reduction gear device DF is followed by axles DS connected with tires (vehicle wheels) TI.

Figure 16:
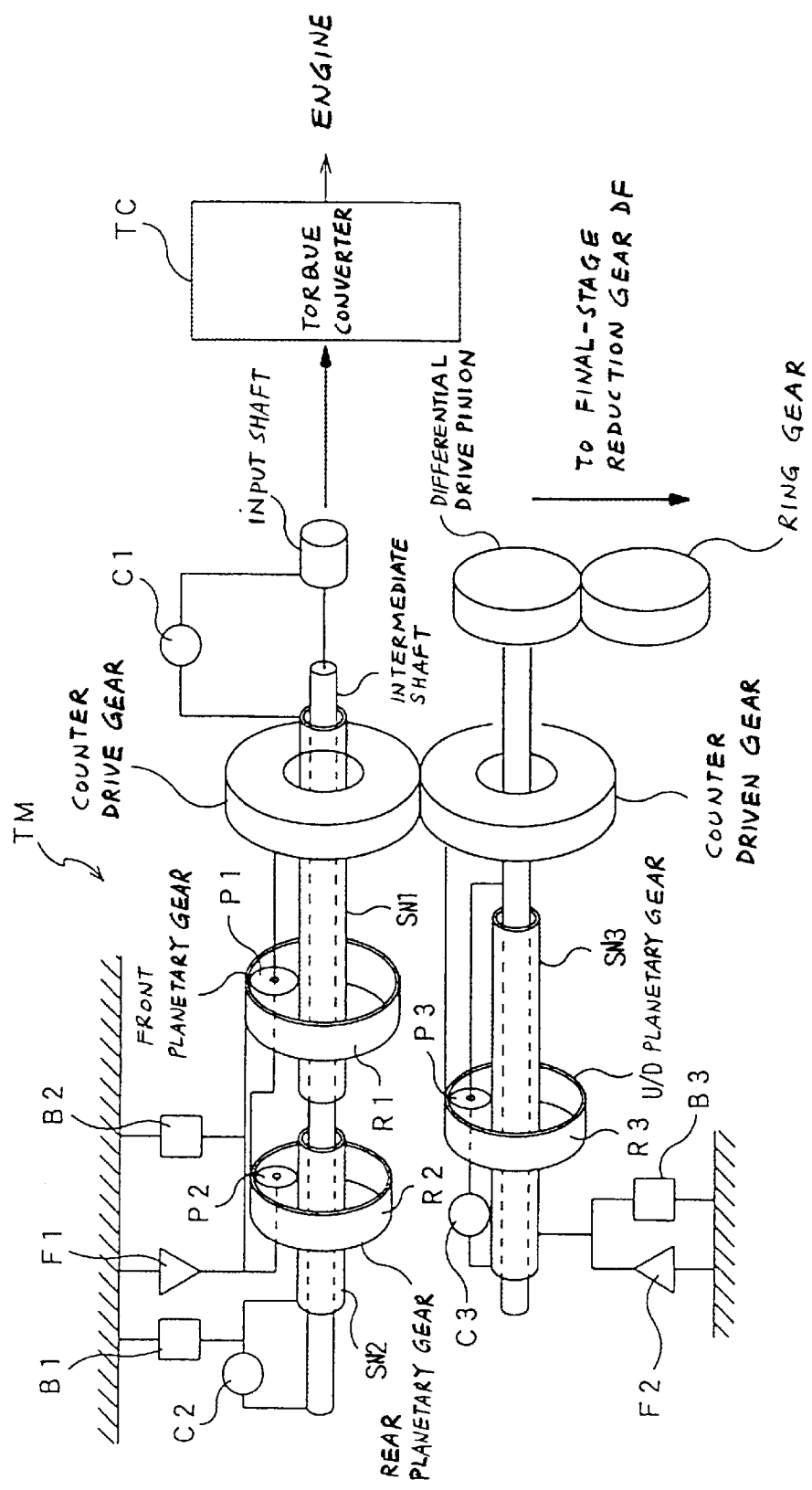
FIG. 16 is a diagram of a transmission in FIG. 15.

As shown in FIG. 16, the transmission TM includes 3-stage planetary gear trains, clutches C1, C2, and C3, brakes B1, B2, and B3, one-way clutches F1 and F2, and a pair of counter gears. The 3-stage planetary gear trains are referred to as the front planetary gear, the rear planetary gear, and the U/D planetary gear, respectively. The front planetary gear has a sun gear SN1, a pinion P1 in mesh with the sun gear SN1, and a ring gear R1 in mesh with the pinion P1. The rear planetary gear has a sun gear SN2, a pinion P2 in mesh with the sun gear SN2, and a ring gear R2 in mesh with the pinion P2. The U/D planetary gear has a sun gear SN3, a pinion P3 in mesh with the sun gear SN3, and a ring gear R3 in mesh with the pinion P3. The clutches C1, C2, and C3 are referred to as the forward clutch C1, the direct clutch C2, and the U/D clutch C3, respectively. The brakes B1, B2, and B3 are referred to as the second brake B1, the first brake B2, and the U/D brake B3, respectively. The one-way clutches F1 and F2 are referred to as the first one-way clutch F1 and the second one-way clutch F2, respectively. Each of the clutches C1, C2, C3, F1, and F2, and the brakes B1, B2, and B3 can be changed between an engaged state and a disengaged state (a release state).

The transmission TM further includes an input shaft connected to the torque converter TC, and an intermediate shaft connected to the input shaft. The forward clutch C1 selectively connects and disconnects the transmission input shaft and the sun gear SN1 of the front planetary gear to and from each other when assuming its engaged state and its disengaged state, respectively. When the transmission input shaft and the sun gear SN1 of the front planetary gear are connected by the forward clutch C1, a drive force traveling to the transmission input shaft from the engine E via the torque converter TC is transmitted to the sun gear SN1 of the front planetary gear. The direct clutch C2 selectively connects and disconnects the intermediate shaft and the sun gear SN2 of the rear planetary gear to and from each other when assuming its engaged state and its disengaged state, respectively. In the case where at least one of the forward clutch C1 and the direct clutch C2 is in its engaged state, the drive force is transmitted from the transmission input shaft to an inner portion of the transmission TM. The U/D clutch C3 selectively connects and disconnects the carrier of the U/D planetary gear and the sun gear SN3 thereof to and from each other when assuming its engaged state and its disengaged state, respectively.

The second brake B1 selectively locks and unlocks the sun gear SN2 of the rear planetary gear when assuming its engaged state and its disengaged state, respectively. The first brake B2 selectively locks and unlocks the ring gear R1 of the front planetary gear and the carrier of the rear planetary gear when assuming its engaged state and its disengaged state, respectively. The U/D brake B3 selectively locks and unlocks the sun gear SN3 of the U/D planetary gear when assuming its engaged state and its disengaged state, respectively.

The first one-way clutch F1 selectively locks and unlocks the ring gear R1 of the front planetary gear and the carrier of the rear planetary gear with respect to leftward rotation (counterclockwise rotation) thereof when assuming its engaged state and its disengaged state, respectively. The second one-way clutch F2 selectively locks and unlocks the sun gear SN3 of the U/D planetary gear with respect to rightward rotation (clockwise rotation) thereof when assuming its engaged state and its disengaged state, respectively.

Hydraulic drive forces for the clutches C1, C2, C3, F1, and F2, and the brakes B1, B2, and B3 are fed from a hydraulic circuit (not shown) controlled by the AT-ECU 115. Accordingly, the state of each of the clutches C1, C2, C3, F1, and F2, and the brakes B1, B2, and B3 can be controlled by the AT-ECU 115. A hydraulic pressure applied to the hydraulic circuit is generated by a mechanically-driven hydraulic pump (not shown) or the electrically-driven hydraulic pump OP. The mechanically-driven hydraulic pump is powered by the engine E. The clutches C1, C2, C3, F1, and F2, and the brakes B1, B2, and B3 are controlled to change a used gear (an engaged gear or an active gear) in the transmission TM to provide gear-ratio change among four different values or four different speeds.

As shown in FIG. 17, for the D range, the engaged gear can be changed among first, second, third, and fourth gears. In other words, for the D range, the automatic transmission AT can be changed among first, second, third, and fourth gear positions (first-gear, second-gear, third-gear, and fourth-gear engaged positions). For the 2 range, the engaged gear can be changed between the first and second gears. In other words, for the 2 range, the automatic transmission AT can be changed between the first and second gear positions. FIG. 17 indicate the relation among the shift range, the engaged gear, the states of the clutches C1, C2, C3, F1, and F2, and the states of the brakes B1, B2, and B3. In FIG. 17, every circle denotes that a related clutch or brake is in its engaged state.

At the first gear position in the D range or the 2 range, the forward clutch C1, the U/D brake B3, and the first and second one-way clutches F1 and F2 are in their engaged states whereas the other clutches and brakes are in their disengaged states. Since the ring gear R1 of the front planetary gear is locked by the first one-way clutch F1 with respect to leftward rotation (counterclockwise rotation) thereof although being unlocked by the first brake B2, only rightward rotation (clockwise rotation) of the ring gear R1 is permitted. In this case, the transmission TM operates as follows.

When the engine E drives the axles DS, the sun gear SN1 of the front planetary gear rotates clockwise so that the pinion P1 thereof rotates counterclockwise about its axis. Since the ring gear R1 of the front planetary gear is locked with respect to counterclockwise rotation thereof, the pinion P1 receives a reactionary force from the ring gear R1 and hence rotates clockwise about the sun gear SN1 while rotating counterclockwise about its axis. Therefore, a counter drive gear connected with the pinion P1 rotates clockwise, and a counter driven gear in mesh with the counter drive gear rotates counterclockwise. Since the sun gear S3 of the U/D planetary gear is locked by the U/D brake B3, the rotational force is transmitted from the counter driven gear toward the axles DS via the U/D planetary gear.

On the other hand, when the engine E is driven by the axles DS, the counter driven gear rotates counterclockwise and the counter drive gear rotates clockwise since the sun gear S3 of the U/D planetary gear is locked by the U/D brake B3. The pinion P1 of the front planetary gear rotates clockwise about the sun gear SN1 thereof as the counter drive gear rotates clockwise. The ring gear R1 of the front planetary gear is locked with respect to counterclockwise rotation thereof, and only clockwise rotation of the sun gear R1 is permitted. Therefore, the sun gear R1 rotates clockwise in accordance with the clockwise rotation of the pinion P1 about the sun gear SN1. The ring gear R1 races in this way, and the transmission of motive power from the pinion P1 to the sun gear SN1 is inhibited. Thus, the transmission of motive power from the axles DS toward the engine E is cut off, and engine brake is prevented from acting.

At the first gear position in the L range, the forward clutch C1, the first brake B2, the U/D brake B3, and the first and second one-way clutches F1 and F2 are in their engaged states whereas the other clutches and brake are in their disengaged states. The ring gear R1 of the front planetary gear is locked by the first brake B2 with respect to both leftward rotation and rightward rotation (counterclockwise rotation and clockwise rotation) thereof. In this case, the transmission TM operates as follows. When the engine E is driven by the axles DS, the counter driven gear rotates counterclockwise and the counter drive gear rotates clockwise since the sun gear S3 of the U/D planetary gear is locked by the U/D brake B3. The pinion P1 of the front planetary gear rotates clockwise about the sun gear SN1 thereof as the counter drive gear rotates clockwise. Since the ring gear R1 of the front planetary gear is locked by the first brake B2 with respect to clockwise rotation thereof, the pinion P1 receives a reactionary force from the ring gear R1 and hence rotates the sun gear SN1. Thus, motive power is transmitted from the axles DS to the sun gear SN1 of the front planetary gear. The motive power is further transmitted to the engine E via the torque converter TC. Accordingly, engine brake is effected.

At each of the other speeds in the D and 2 ranges, engine brake can be effected at any time.

Figure 18:
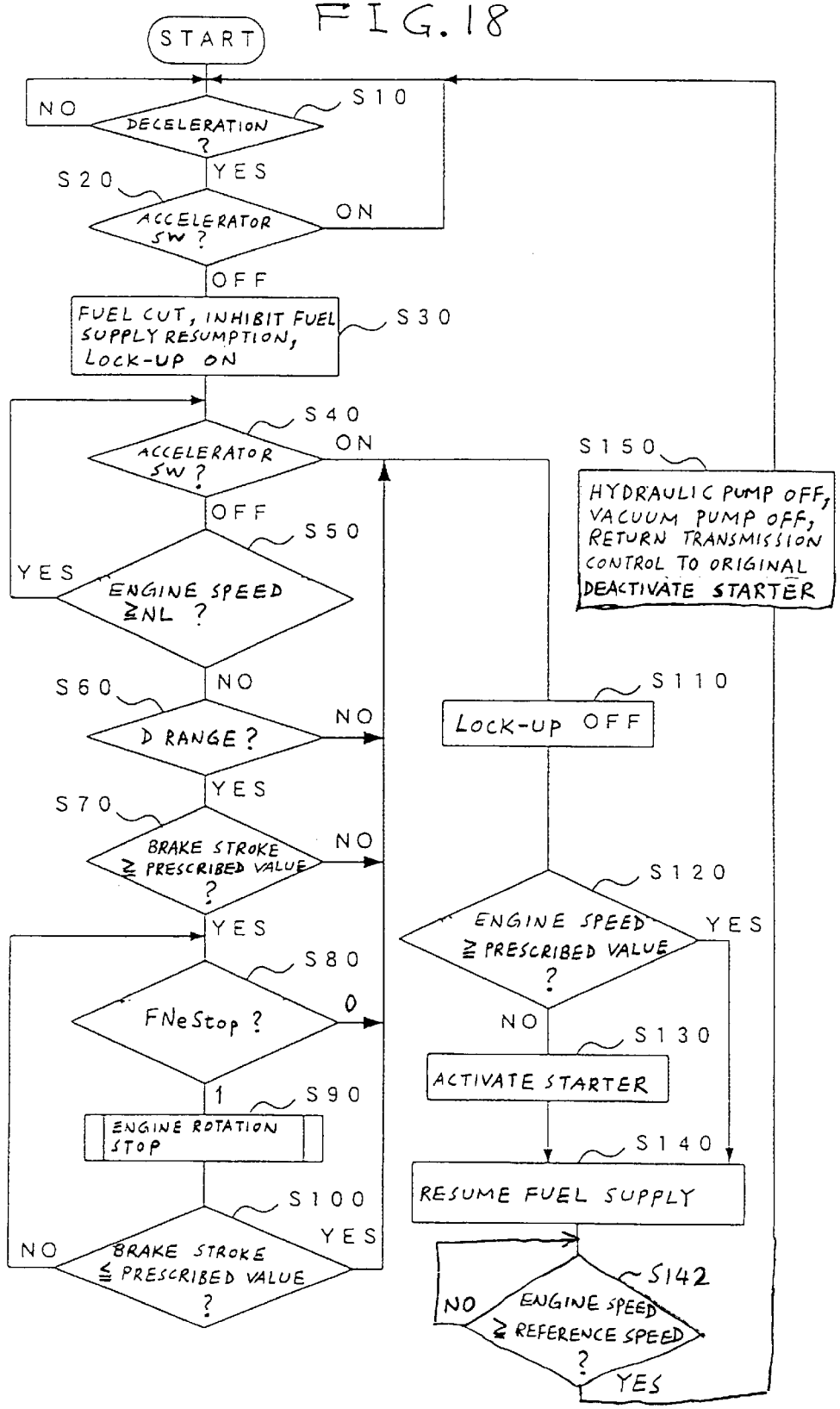
FIG. 18 is a flowchart of a main routine of a control program for an eco-run ECU in FIG. 15.

As previously mentioned, the eco-run ECU 110 operates in accordance with a control program stored in its internal ROM. FIG. 18 is a flowchart of a main segment (a main routine) of the control program.

With reference to FIG. 18, a first step S10 of the control-program segment determines whether or not the vehicle is decelerating by referring to the output signal of the acceleration/deceleration detecting means 113. When the vehicle is decelerating, the program advances from the step S10 to a step S20. Otherwise, the step S10 is repeated.

The step S20 accesses the accelerator switch 117 via the AT-ECU 115. The step S20 determines whether the accelerator pedal is depressed or undepressed, that is, whether the accelerator switch 117 is in its ON position or its OFF position by referring to the output signal therefrom. When the accelerator pedal is undepressed, that is, when the accelerator switch 117 is in its OFF position, the program advances from the step S20 to a step S30. Otherwise, the program returns from the step S20 to the step S10.

The step S30 controls the engine ECU 114 to cut off the supply of fuel to the engine E and inhibit the resumption of fuel supply thereto. In addition, the step S30 controls the AT-ECU 115 to set the lock-up clutch LC for the torque converter TC in its ON state (its engaged state). Thus, the crankshaft of the engine E which does not generate torque as a result of the fuel cut-off is driven by the axles DS, and hence continues to rotate. After the step S30, the program advances to a step S40.

The step S40 accesses the accelerator switch 117 via the AT-ECU 115. The step S40 determines whether the accelerator pedal is depressed or undepressed, that is, whether the accelerator switch 117 is in its ON position or its OFF position by referring to the output signal therefrom. When the accelerator pedal is undepressed, that is, when the accelerator switch 117 is in its OFF position, the program advances from the step S40 to a step S50. Otherwise, the program advances from the step S40 to a step S110.

The step S110 and subsequent steps are designed to execute an engine restart procedure. Specifically, the step S110 controls the AT-ECU 115 to set the lock-up clutch LC for the torque converter TC in its OFF state (its disengaged state or its release state).

A step S120 following the step S110 accesses the engine ECU 114 to get information about the engine speed (the rotational speed of the crankshaft of the engine E). The step S120 compares the engine speed with a prescribed value. The prescribed value corresponds to the lower limit of an engine speed range in which the engine E can be restarted by the resumption of fuel supply without being cranked by the starter ST. When the engine speed is equal to or higher than the prescribed value, the program advances from the step S120 to a step S140. Otherwise, the program advances from the step S120 to a step S130.

The step S130 activates the starter ST. As a result, the engine E is cranked by the starter ST. After the step S130, the program advances to the step S140.

The step S140 controls the engine ECU 114 to resume the fuel supply to the engine E. As result, the engine E is restarted. After the step S140, the program advances to a step S142.

The step S142 accesses the engine ECU 114 to get information about the engine speed (the rotational speed of the crankshaft of the engine E). The step S142 compares the engine speed with a predetermined reference value. When the engine speed is equal to or higher than the predetermined reference value, the program advances from the step S142 to a step S150. Otherwise, the step S142 is repeated.

The step S50 which follows the step S40 sets a reference value NL for the engine speed. The reference value NL is also referred to as the lower limit value NL. The step S50 accesses the engine ECU 114 to get information about the engine speed. The step S50 compares the engine speed with the lower limit value NL. When the engine speed is equal to or higher than the lower limit value NL, the program returns from the step S50 to the step S40. Otherwise, the program advances from the step S50 to a step S60.

Figure 19:
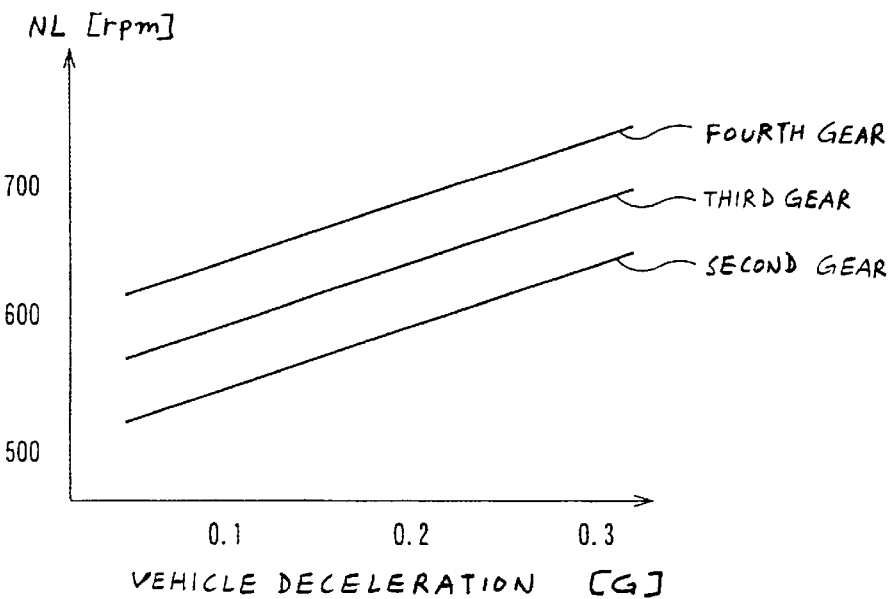
FIG. 19 is a diagram of a map denoting a relation between a vehicle deceleration and a lower limit value for engine speed which is used by a step in FIG. 18.

The ROM in the eco-run ECU 110 stores data representing a map in which the lower limit value NL is plotted as a function of parameters including the deceleration of the vehicle and the gear position of the automatic transmission AT. FIG. 19 shows an example of the map. The lower limit value NL is greater than a minimum engine speed (for example, 500 rpm) at which the vehicle is prevented from vibrating due to an engine torque variation during gear change operation of the automatic transmission AT. Specifically, the lower limit value NL is raised as the deceleration of the vehicle increases. The lower limit value NL is raised as the automatic transmission AT changes from the second gear position to the fourth gear position through the third gear position.

This setting of the lower limit value NL provides the following advantages. The crankshaft of the engine E can be driven and rotated by the axles DS for a long time. The engine speed can quickly pass through a vehicle vibration range (a resonance range). Thus, it is possible to effectively suppress vehicle vibration caused by a crankshaft torque variation in a low engine speed range.

The step S50 in FIG. 18 accesses the AT-ECU 115 to get information about the gear position of the automatic transmission AT. The step S50 derives the deceleration of the vehicle from the output signal of the acceleration/deceleration detecting means 113. The step S50 accesses the map of FIG. 19 in response to the gear position of the automatic transmission AT and the deceleration of the vehicle, thereby setting the lower limit value NL. As previously mentioned, the step S50 compares the engine speed with the lower limit value NL. When the engine speed is less than the lower limit value NL, the program advances from the step S50 to the step S60. Otherwise, the program returns from from the step S50 to the step S40.

The step S60 accesses the shift position sensor 116 via the AT-ECU 115. The step S60 determines whether or not the D range is currently selected on the basis of the output signal from the shift position sensor 116. When the D range is currently selected, the program advances from the step S60 to a step S70. Otherwise, the program advances from the step S60 to the step S110 to execute the engine restart procedure.

The step S70 derives the degree of depression of the brake pedal from the output signal of the brake stroke sensor 111. The step S70 compares the degree of depression of the brake pedal with a first prescribed value corresponding to a requirement for vehicle stop. When the degree of depression of the brake pedal is equal to or greater than the first prescribed value, that is, when it is predicted that the vehicle is required to stop, the program advances from the step S70 to a step S80. Otherwise, the program advances from the step S70 to the step S110 to execute the engine restart procedure.

The eco-run ECU 110 is electrically connected with a battery sensor and left-hand and right-hand winker switches (not shown). The battery sensor detects the amount of electric power remaining in the battery BT. The battery sensor informs the eco-run ECU 110 of the amount of electric power remaining in the battery BT. The left-hand and right-hand winker switches output signals to the eco-run ECU 110 which represent whether the left-hand and right-hand winker switches are in their ON positions or their OFF positions. The control program for the eco-run ECU 110 has a subroutine which is repetitively executed by timer-based interruption. The subroutine of the control program is designed to set an engine rotation stop permission flag FNeStop. According to the subroutine of the control program, the amount of electric power remaining in the battery BT is compared with a predetermined reference value at which the starter ST can be adequately activated. When the amount of electric power remaining in the battery BT is less than the reference value, the engine rotation stop permission flag FNeStop is set to "0". A determination is made as to whether or not one of the left-hand and right-hand winker switches is in its ON position. When one of the left-hand and right-hand winker switches is in its ON position, the engine rotation stop permission flag FNeStop is set to "0". In other cases, the engine rotation stop permission flag FNeStop is set to "1".

The step S80 in FIG. 18 refers to the engine stop permission flag FNeStop set by the subroutine of the control program. The step S80 determines whether the engine rotation stop permission flag FNeStop is "1" or "0". When the engine rotation stop permission flag FNeStop is "1", the program advances from the step S80 to a block S90 for executing an engine rotation stop procedure (a crankshaft rotation stop procedure). On the other hand, when the engine rotation stop permission flag FNeStop is "0", the program advances from the step S80 to the step S110 to execute the engine restart procedure.

Figure 20:
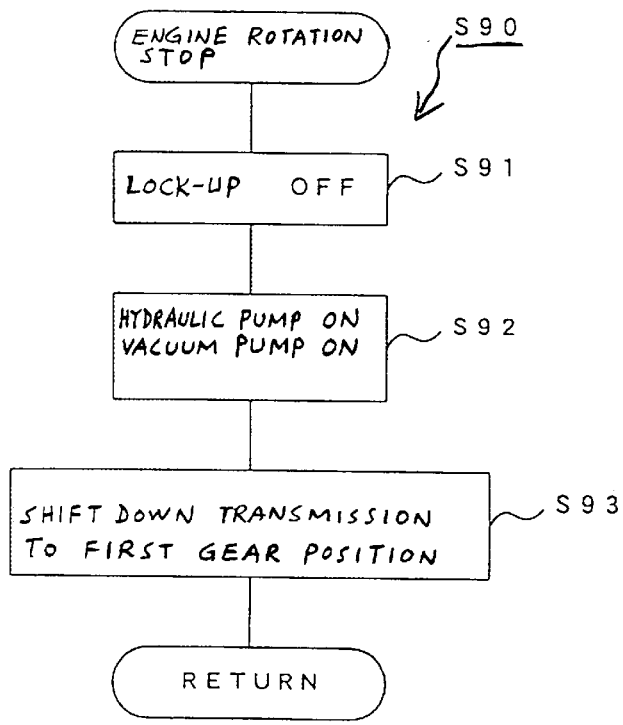
FIG. 20 is a flowchart of an engine rotation stop block in FIG. 18.

As shown in FIG. 20, the engine rotation stop block S90 has steps S91, S92, and S93. The step S91 follows the step S80 (see FIG. 18). The step S91 controls the AT-ECU 115 to set the lock-up clutch LC for the torque converter TC in its OFF state) its disengaged state or its release state). The step S92 which is subsequent to the step S91 turns on the hydraulic pump OP. Thus, the hydraulic pump OP generates a hydraulic pressure necessary to operate the automatic transmission AT during the stopping of the engine E. In addition, the step S92 turns on the vacuum pump VP. Thus, the vacuum pump VP generates a vacuum necessary to operate the brake system 118 during the stopping of the engine E. The step S93 which follows the step S92 controls the AT-ECU 115 to shift down the automatic transmission AT to the first gear position. The step S93 is executed when the previous step S60 determines that the D range is currently selected. At the first gear position in the D range, the transmission of motive power from the axles DS to the engine E is cut off, and hence the crankshaft of the engine E can promptly stop. Therefore, it is possible to effectively suppress vehicle vibration caused by a crankshaft torque variation in a low engine speed range. After the step S93, the program advances to a step S100 in FIG. 18.

With reference to FIG. 18, the step S100 derives the degree of depression of the brake pedal from the output signal of the brake stroke sensor 111. The step S100 compares the degree of depression of the brake pedal with a second prescribed value. When the degree of depression of the brake pedal is greater than the second prescribed value, the program returns from the step S100 to the step S80. On the other hand, when the degree of depression of the brake pedal is equal to or less than the second prescribed value, the program advances from the step S100 to the step S110 to execute the engine restart procedure. Preferably, the second prescribed value is smaller than the first prescribed value used in the step S70. The second prescribed value corresponds to a small brake-pedal depression degree at which creep-based motive force can be overcome, or at which the release of the brake pedal can be predicted or expected.

The step S110 and the subsequent steps S120, S130, S140, and S142 restart the engine E in the previously-mentioned way. The torque converter TC absorbs the rotational speed difference between the engine side and the axle side at the restart of the engine E. Therefore, it is possible to suppress an acceleration-based shock caused by the engine restart. After the step S142 determines that the engine speed is equal to or higher than the predetermined reference value, the program advances to the step S150.

The step S150 deactivates the starter ST. Also, the step S150 turns off the hydraulic pump OP. In addition, the step S150 turns off the vacuum pump VP. Furthermore, the step S150 controls the AT-ECU 115 to return the gear change control of the automatic transmission AT to a normal mode.

As a result, the shift-down of the automatic transmission AT to the first gear position by the step S93 (see FIG. 20) is canceled. After the step S150, the program returns to the step S10.

As understood from the previous description, the engine restart procedure is executed after the step S100 detects that the degree of depression of the brake pedal is decreased. Therefore, it is possible to restart the engine E during the time interval for which the depression of the brake pedal is replaced by the depression of the accelerator pedal. Thus, a requirement for vehicle reacceleration can be met with a good response performance. When the step S93 shifts down the automatic transmission AT to the first gear position, motive power can be transmitted from the engine E to the axles DS. In this case, a requirement for vehicle reacceleration can be promptly met since clutch control is unnecessary.

Figure 21:
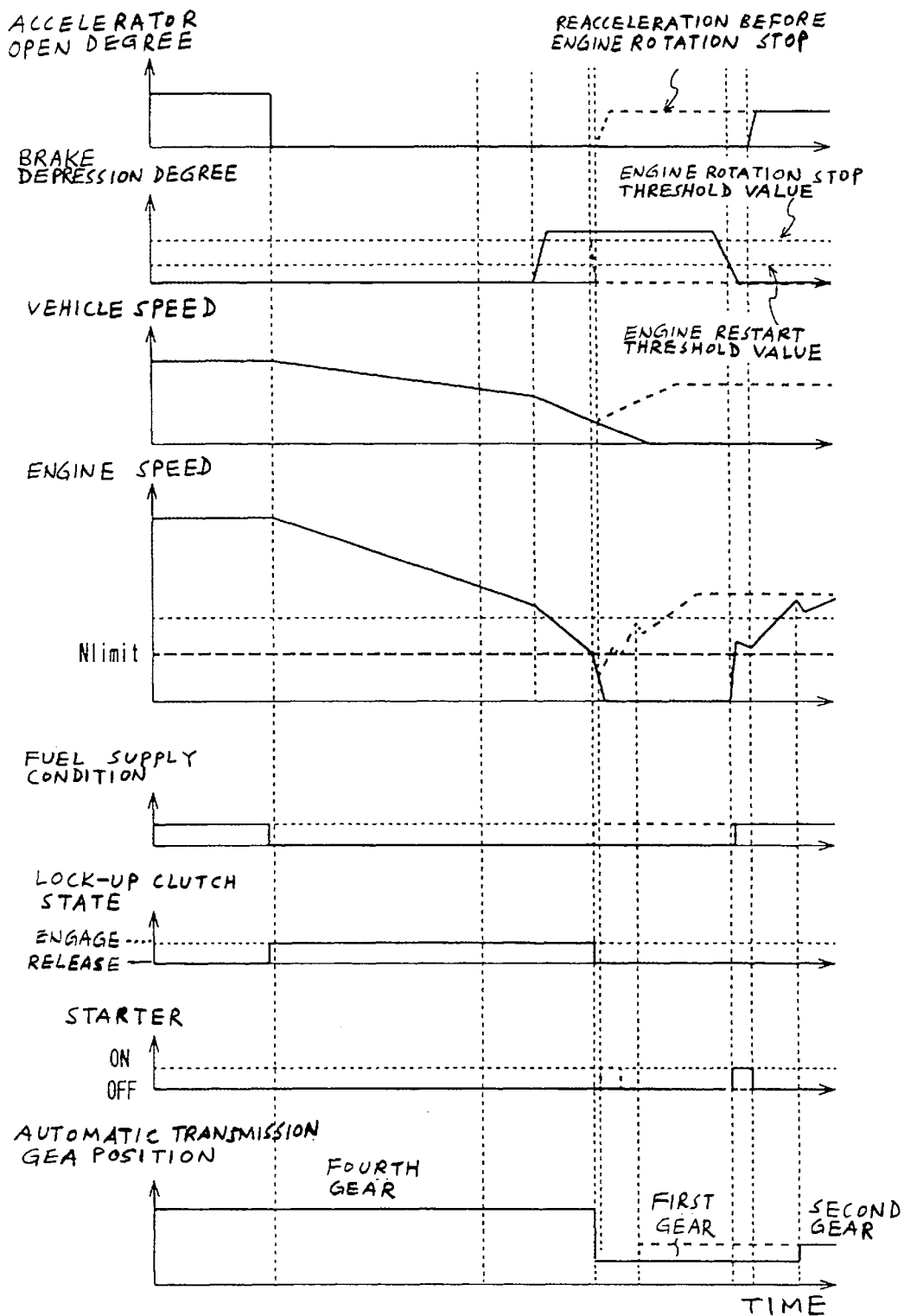
FIG. 21 is a time-domain diagram of an example of conditions of various parameters which occur during the execution of an engine stop procedure and a subsequent engine restart procedure in the engine control apparatus of FIG. 15.

As shown in FIG. 21, the degree of depression of the accelerator pedal (the accelerator opening degree), the degree of depression of the brake pedal, the vehicle speed, the engine speed, the condition of the fuel supply to the engine E, the state of the lock-up clutch LC, the state of the starter ST, and the gear position of the automatic transmission AT vary in time domain during the execution of an engine stop procedure and a subsequent engine restart procedure. The broken lines in FIG. 21 denote the conditions of the above-indicated parameters which occur in the case where the vehicle is required to reaccelerate when the engine speed is still higher than zero.

In the case where the D range is selected during the automatic engine stop procedure, the step S93 in FIG. 20 shifts down the automatic transmission AT to the first gear position. In other words, the automatic transmission AT is changed to a specified state, that is, the first-gear engaged state. At the first gear position in the D range, the transmission of motive power from the engine E to the axles DS is permitted. Thus, upon restart of the engine E thereafter, motive power can be promptly transmitted from the engine E to the axles DS. Accordingly, a requirement for vehicle reacceleration can be promptly met. On the other hand, the transmission of motive power from the axles DS toward the engine E is cut off. Thus, it is possible to prevent the crankshaft of the engine E from being driven and rotated by the axles DS. It should be noted that the first-gear engaged position in the 2 range is not used as the previously-mentioned specified state of the automatic transmission AT.

Fifth Embodiment

A fifth embodiment of this invention is similar to the fourth embodiment thereof except that the engine rotation stop block S90 in the control program for the eco-run ECU 110 is modified.

Figure 22:
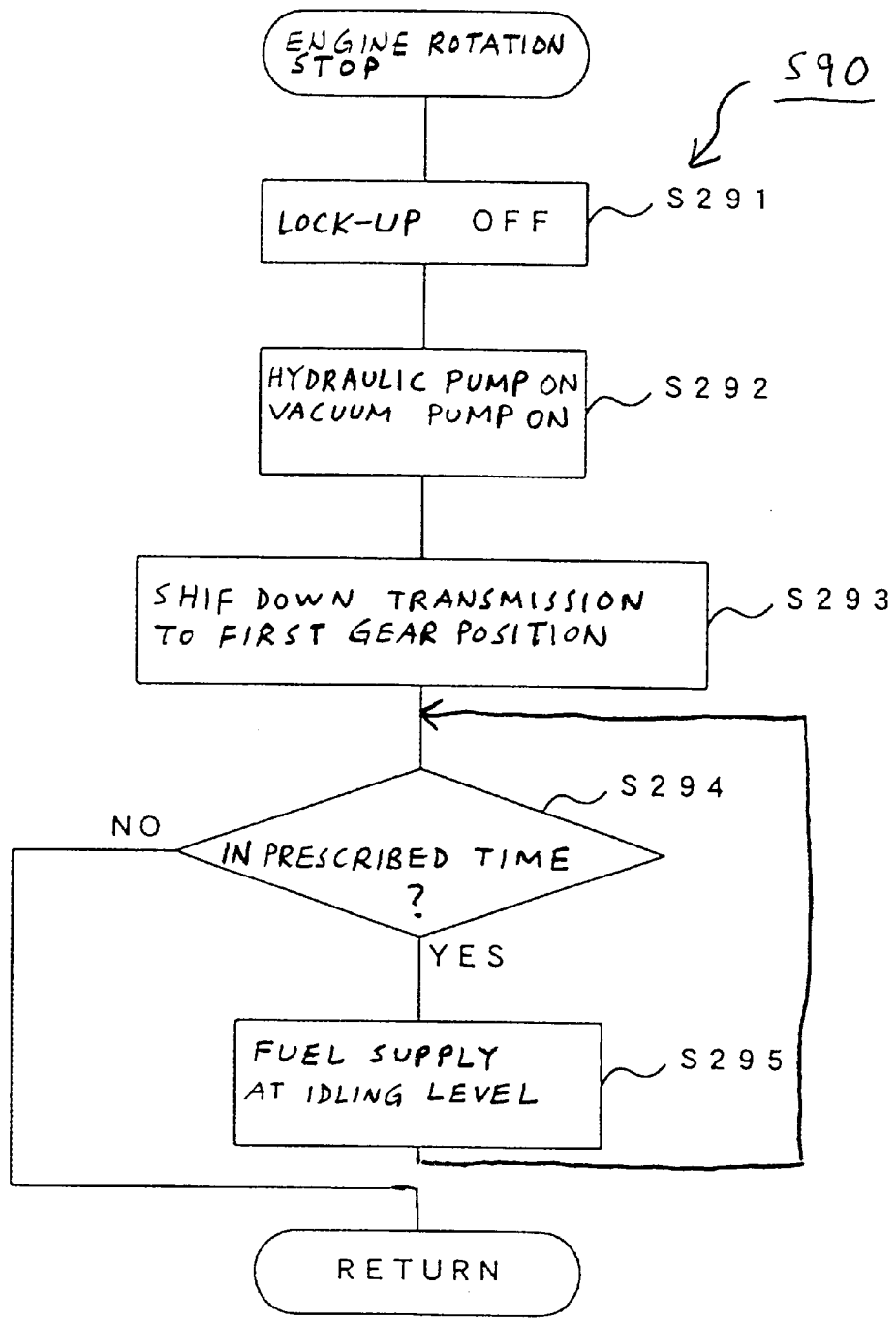
FIG. 22 is a flowchart of an engine rotation stop block in a control program for an eco-run ECU in a fifth embodiment of this invention.

As shown in FIG. 22, the engine rotation stop block S90 in the fifth embodiment of this invention has steps S291, S292, S293, S294, and S295. The step S291 follows the step S80 (see FIG. 18). The step S291 controls the AT-ECU 115 to set the lock-up clutch LC for the torque converter TC in its OFF state (its disengaged state or its release state). The step S292 which is subsequent to the step S291 turns on the hydraulic pump OP. In addition, the step S292 turns on the vacuum pump VP. The step S293 which follows the step S292 controls the AT-ECU 115 to shift down the automatic transmission AT to the first gear position.

The step S294 which is subsequent to the step S293 measures the time elapsed since the moment of the occurrence of the shift-down command by the step S293. The step S294 determines whether or not the time elapsed is in a prescribed time. When the time elapsed is in the prescribed time, the program advances from the step S294 to the step S295. Otherwise, the program exits from the engine rotation stop block S90, and then proceeds to the step S100 (see FIG. 18).

The step S295 controls the engine ECU 114 to supply fuel to the engine E at a specified rate which enables the engine E to idle. After the step S295, the program returns to the step S294.

As a result, the idling-rate fuel supply to the engine E is commenced at the moment of the occurrence of the shift-down command by the step S293. The idling-rate fuel supply is continued until the time elapsed since the moment of the occurrence of the shift-down command reaches the prescribed time. The idling-rate fuel supply is terminated when the time elapsed since the moment of the occurrence of the shift-down command reaches the prescribed time.

In general, there is a time lag (for example, about 0.8 second) between the moment of the occurrence of the shift-down command by the step S293 and the moment of the actual shift-down of the automatic transmission AT. The above-indicated prescribed time is chosen to correspond to this time lag. Therefore, during the prescribed time commencing at the moment of the occurrence of the shift-down command and corresponding to the time lag, fuel remains supplied to the engine E at the idling rate. The idling-rate fuel supply maintains the engine speed above the vehicle vibration range (the resonance range). After the lapse of the prescribed time, that is, after the shift-down of the automatic transmission AT is completed, the drive of the engine E by the axles DS is absent and the idling-rate fuel supply is interrupted to enable the engine speed to quickly pass through the vehicle vibration range.

As shown in FIG. 23, the engine speed, the condition of the fuel supply to the engine E, and the commanded gear position of the automatic transmission AT vary in time domain during the execution of the engine rotation stop procedure by the block S90 in FIG. 22. There is a command for the shift-down of the automatic transmission AT from the third gear position to the first gear position. The idling-rate fuel supply to the engine E is commenced at the moment of the occurrence of the shift-down command. The idling-rate fuel supply is continued until the completion of actual shift-down of the automatic transmission E. Therefore, the engine speed is maintained above the vehicle vibration range (the resonance range) during the time interval between the moment of the occurrence of the shift-down command and the moment of completion of actual shift-down.

Sixth Embodiment

A sixth embodiment of this invention is similar to the fourth embodiment thereof except that the engine rotation stop block S90 in the control program for the eco-run ECU 110 is modified.

Figure 24:
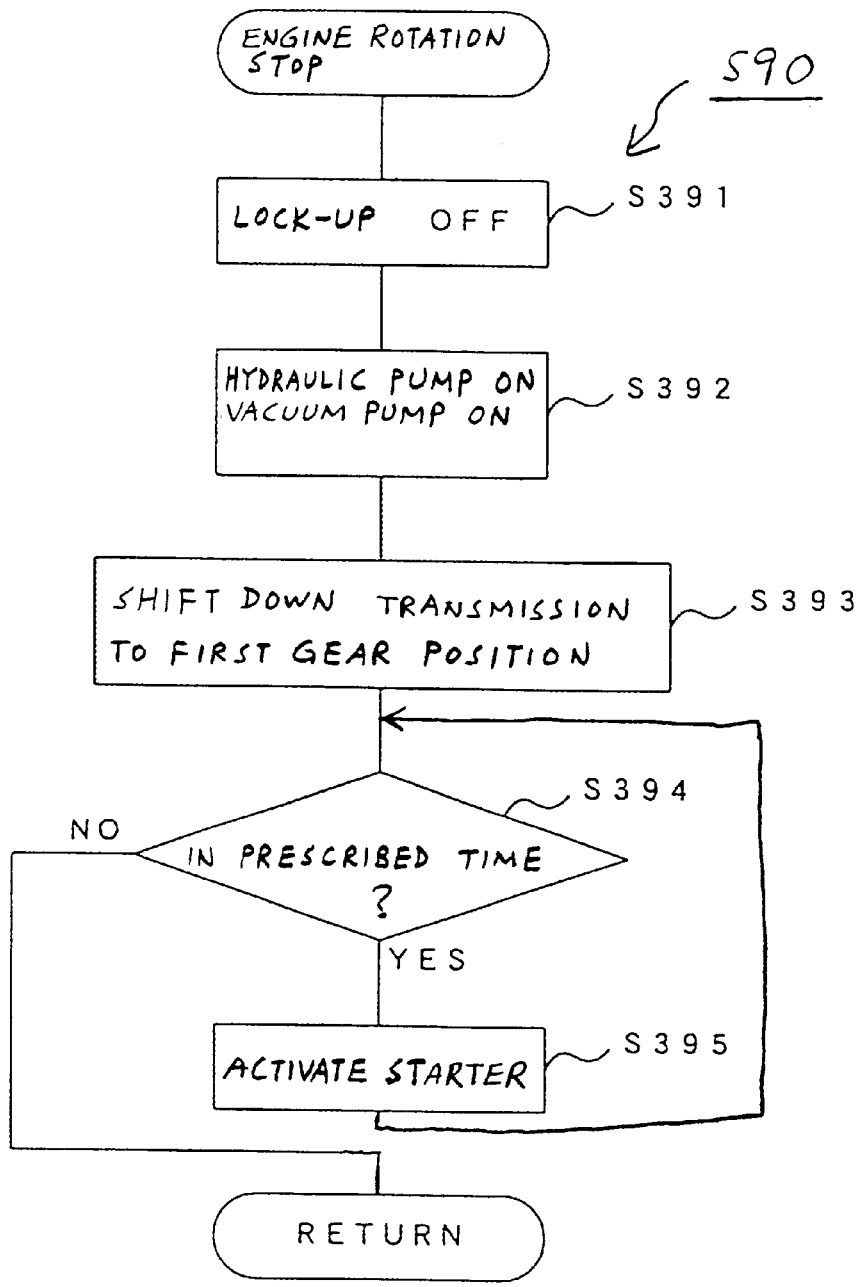
FIG. 24 is a flowchart of an engine rotation stop block in a control program for an eco-run ECU in a sixth embodiment of this invention.

As shown in FIG. 24, the engine rotation stop block S90 in the sixth embodiment of this invention has steps S391, S392, S393, S394, and S395. The step S391 follows the step S80 (see FIG. 18). The step S391 controls the AT-ECU 115 to set the lock-up clutch LC for the torque converter TC in its OFF state (its disengaged state or its release state). The step S392 which is subsequent to the step S391 turns on the hydraulic pump OP. In addition, the step S392 turns on the vacuum pump VP. The step S393 which follows the step S392 controls the AT-ECU 115 to shift down the automatic transmission AT to the first gear position.

The step S394 which is subsequent to the step S393 measures the time elapsed since the moment of the occurrence of the shift-down command by the step S393. The step S394 determines whether or not the time elapsed is in a prescribed time. When the time elapsed is in the prescribed time, the program advances from the step S394 to the step S395. Otherwise, the program exits from the engine rotation stop block S90, and then proceeds to the step S100 (see FIG. 18).

The step S395 activates the starter ST. As a result, the engine E is driven by the starter ST. After the step S395, the program returns to the step S394.

As a result, the activation of the starter ST to drive the engine E is commenced at the moment of the occurrence of the shift-down command by the step S393. The activation of the starter ST is continued until the time elapsed since the moment of the occurrence of the shift-down command reaches the prescribed time. The starter ST is deactivated when the time elapsed since the moment of the occurrence of the shift-down command reaches the prescribed time.

In general, there is a time lag (for example, about 0.8 second) between the moment of the occurrence of the shift-down command by the step S393 and the moment of the actual shift-down of the automatic transmission AT. The above-indicated prescribed time is chosen to correspond to this time lag. Therefore, during the prescribed time commencing at the moment of the occurrence of the shift-down command and corresponding to the time lag, the starter ST continues to drive the engine E. The drive of the engine E by the starter ST maintains the engine speed above the vehicle vibration range (the resonance range). After the lapse of the prescribed time, that is, after the shift-down of the automatic transmission AT is completed, the starter ST is deactivated to enable the engine speed to quickly pass through the vehicle vibration range.

Figure 25:
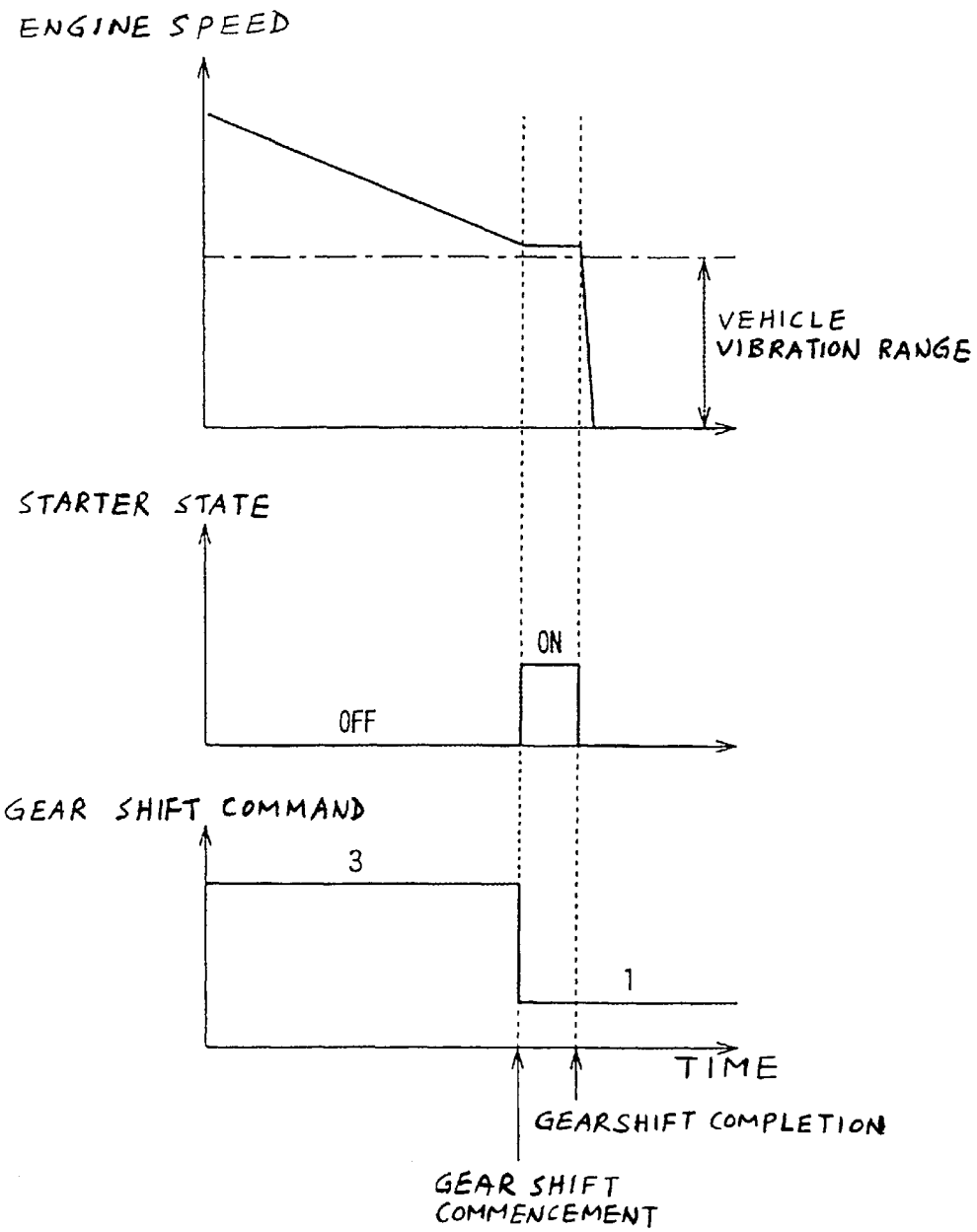
FIG. 25 is a time-domain diagram of an example of conditions of engine speed, starter, and gear shift command during the execution of an engine stop procedure in the sixth embodiment of this invention.

As shown in FIG. 25, the engine speed, the state of the starter ST, and the commanded gear position of the automatic transmission AT vary in time domain during the execution of the engine rotation stop procedure by the block S90 in FIG. 24. There is a command for the shift-down of the automatic transmission AT from the third gear position to the first gear position. The activation of the starter ST to drive the engine E is commenced at the moment of the occurrence of the shift-down command. The activation of the starter ST is continued until the completion of actual shift-down of the automatic transmission E. Therefore, the engine speed is maintained above the vehicle vibration range (the resonance range) during the time interval between the moment of the occurrence of the shift-down command and the moment of completion of actual shift-down.

Seventh Embodiment

A seventh embodiment of this invention is similar to one of the fourth, fifth, and sixth embodiments thereof except that the automatic transmission AT is replaced by another automatic transmission designed as follows. The automatic transmission is provided with a one-way clutch which permits the transmission of motive power from the engine E toward the axles DS but cuts off the transmission of motive power from the axles DS toward the engine E.

Eighth Embodiment

An eighth embodiment of this invention is similar to one of the fourth, fifth, and sixth embodiments thereof except that the automatic transmission AT is replaced by a continuously variable transmission (CVT), and the input shaft or the output shaft of the CVT is provided with a combination of a one-way clutch and a brake. The combination of the one-way clutch and the brake is designed to permit the transmission of motive power only in one direction between the engine E and the axles DS.

What is claimed is:

1. An engine control apparatus comprising:

brake depression degree detecting means for detecting a degree of depression of a brake pedal in a vehicle;

brake depression degree judging means for judging whether or not the detected degree of depression of the brake pedal is smaller than a first prescribed value;

deceleration detecting means for detecting a deceleration of the vehicle;

automatic engine stop and restart controlling means for automatically stopping an engine powering the vehicle when the deceleration detecting means detects a deceleration of the vehicle and the brake depression degree judging means judges that the detected degree of depression of the brake pedal is not smaller than the first prescribed value; and engine speed detecting means for detecting a rotational speed of the engine, and wherein the brake depression degree judging means executes judging whether or not the detected degree of depression of the brake pedal is smaller than the first prescribed value when the rotational engine speed detected by the engine speed detecting means drops to a reference value set on the basis of a maximum speed in a range of resonance between the engine and a body of the vehicle.

2. An engine control apparatus as recited in claim 1, further comprising fuel supply controlling means for cutting off a supply of fuel to the engine when the deceleration detecting means detects a deceleration of the vehicle, and for resuming the supply of fuel to the engine when the brake depression degree judging means judges that the detected degree of depression of the brake pedal is smaller than the first prescribed value.

3. An engine control apparatus as recited in claim 1, wherein the automatic engine stop and restart controlling means comprises means for temporarily increasing a load caused by an accessory in the vehicle when automatically stopping the engine.

4. An engine control apparatus as recited in claim 1, further comprising steering angle detecting means for detecting a steering angle of a steering wheel in the vehicle, and wherein the automatic engine stop and restart controlling means inhibits automatic stop of the engine when the steering angle detecting means detects a steering angle greater than a predetermined value.

5. An engine control apparatus as recited in claim 1, further comprising road surface slope angle detecting means for detecting a slope angle of a road surface which the vehicle is on, and wherein the automatic engine stop and restart controlling means inhibits automatic stop of the engine when the slope angle detected by the road surface slope angle is greater than a predetermined value.

6. An engine control apparatus comprising:

brake depression degree detecting means for detecting a degree of depression of a brake pedal in a vehicle;

brake depression degree judging means for judging whether or not the detected degree of depression of the brake pedal is smaller than a first prescribed value;

deceleration detecting means for detecting a deceleration of the vehicle;

automatic engine stop and restart controlling means for automatically stopping an engine powering the vehicle when the deceleration detecting means detects a deceleration of the vehicle and the brake depression degree judging means judges that the detected degree of depression of the brake pedal is not smaller than the first prescribed value; and wherein the brake depression degree judging means operates for judging whether or not the detected degree of depression of the brake pedal is greater than a second prescribed value smaller than the first prescribed value, and the automatic engine stop and restart controlling means operates for restarting the engine when the brake depression degree judges that the detected degree of depression of the brake pedal is not greater than the second prescribed value.

7. An engine control apparatus comprising:

brake depression degree detecting means for detecting a degree of depression of a brake pedal in a vehicle;

brake depression degree judging means for judging whether or not the detected degree of depression of the brake pedal is smaller than a first prescribed value;

deceleration detecting means for detecting a deceleration of the vehicle;

automatic engine stop and restart controlling means for automatically stopping an engine powering the vehicle when the deceleration detecting means detects a deceleration of the vehicle and the brake depression degree judging means judges that the detected degree of depression of the brake pedal is not smaller than the first prescribed value; and brake depression speed detecting means for detecting a speed of depression of a brake pedal in the vehicle, and wherein the automatic engine stop and restart controlling means inhibits automatic stop of the engine when the speed detected by the brake depression speed detecting means is higher than a predetermined speed.

8. An engine control apparatus comprising:

brake depression decree detecting means for detecting a decree of depression of a brake pedal in a vehicle;

brake depression degree judging means for judging whether or not the detected degree of depression of the brake pedal is smaller than a first prescribed value;

deceleration detecting means for detecting a deceleration of the vehicle;

automatic engine stop and restart controlling means for automatically stopping an engine powering the vehicle when the deceleration detecting means detects a deceleration of the vehicle and the brake depression degree judging means judges that the detected degree of depression of the brake pedal is not smaller than the first prescribed value; and relative speed detecting means for detecting a relative speed between the vehicle and a preceding vehicle, and wherein the automatic engine stop and restart controlling means inhibits automatic stop of the engine when the relative speed detected by the relative speed detecting means is higher than a predetermined speed.

* * * * *